(12) United States Patent
Kuroda et al.

(10) Patent No.: US 7,527,126 B2
(45) Date of Patent: May 5, 2009

(54) EXHAUST APPARATUS OF AN INTERNAL COMBUSTION ENGINE

(75) Inventors: Osamu Kuroda, Toyota (JP); Masashi Ota, Kariya (JP); Masayoshi Tange, Nagoya (JP)

(73) Assignee: Sango Co., Ltd., Miyoshi-Cho (JP)

( * ) Notice: Subject to any disclaimer, the term of this patent is extended or adjusted under 35 U.S.C. 154(b) by 150 days.

(21) Appl. No.: 11/631,481

(22) PCT Filed: Jun. 28, 2005

(86) PCT No.: PCT/JP2005/011784

§ 371 (c)(1),
(2), (4) Date: Jan. 4, 2007

(87) PCT Pub. No.: WO2006/006385

PCT Pub. Date: Jan. 19, 2006

(65) Prior Publication Data

US 2007/0272480 A1    Nov. 29, 2007

(30) Foreign Application Priority Data

Jul. 7, 2004    (JP) ............................. 2004-200686

(51) Int. Cl.
- *F01N 1/16* (2006.01)
- *F01N 3/10* (2006.01)
- *F01N 1/02* (2006.01)
- *F01N 3/00* (2006.01)

(52) U.S. Cl. ........................................ 181/254; 60/299

(58) Field of Classification Search ................. 181/254, 181/253, 237; 60/324, 299, 302

See application file for complete search history.

(56) References Cited

U.S. PATENT DOCUMENTS

| | | | | | |
|---|---|---|---|---|---|
| 1,403,614 | A | * | 1/1922 | Malsack | 181/254 |
| 1,658,766 | A | * | 2/1928 | Gray | 181/254 |
| 2,488,563 | A | * | 11/1949 | Sills | 60/288 |
| 2,673,446 | A | * | 3/1954 | De Salardi | 123/545 |
| 3,097,074 | A | * | 7/1963 | Johnson | 422/115 |
| 5,211,012 | A | * | 5/1993 | Swars | 60/295 |
| 5,386,694 | A |   | 2/1995 | Ogawa et al. | |
| 5,410,875 | A | * | 5/1995 | Tanaka et al. | 60/288 |
| 5,410,876 | A | * | 5/1995 | Simko | 60/288 |

(Continued)

FOREIGN PATENT DOCUMENTS

FR    2570125 A1 *    3/1986

(Continued)

*Primary Examiner*—Edgardo San Martin
(74) *Attorney, Agent, or Firm*—Oliff & Berridge PLC

(57) ABSTRACT

A single valve member is provided for selecting communication of one of two flow passages constituting an exhaust flow passage, and continuously providing a flow passage area of the selected one of the two flow passages. According to this valve member, a changeover of flow passage between a main flow passage with an exhaust processing device disposed therein and a bypass flow passage is performed, and each flow passage area is regulated, to meet an output requirement, exhaust processing requirement and muffling requirement, appropriately. For example, a single valve member 5 is disposed on the upstream side or downstream side of a start catalytic converter 3, whereby communication of one of a main flow passage 1 and a bypass flow passage 2 is selected, and a flow passage area of the selected passage is continuously provided.

12 Claims, 21 Drawing Sheets

U.S. PATENT DOCUMENTS

| | | | |
|---|---|---|---|
| 6,012,284 A | | 1/2000 | Tanaka et al. |
| 6,032,753 A | | 3/2000 | Yamazaki et al. |
| 6,182,445 B1 * | 2/2001 | Yamazaki et al. | 60/277 |
| 6,253,547 B1 * | 7/2001 | Watanabe et al. | 60/297 |
| 6,820,416 B2 * | 11/2004 | Ueno et al. | 60/288 |
| 6,823,660 B2 * | 11/2004 | Minami | 60/280 |
| 6,823,664 B2 * | 11/2004 | Nakatani et al. | 60/295 |
| 6,862,878 B2 * | 3/2005 | Ries-Mueller | 60/277 |
| 7,249,455 B2 * | 7/2007 | Tumati et al. | 60/287 |
| 2004/0144084 A1 | | 7/2004 | Hara |

FOREIGN PATENT DOCUMENTS

| | | | |
|---|---|---|---|
| JP | U-62-008470 | | 1/1987 |
| JP | A-6-074081 | | 3/1994 |
| JP | 06093843 A | * | 4/1994 |
| JP | 06093846 A | * | 4/1994 |
| JP | 06117231 A | * | 4/1994 |
| JP | 06229223 A | * | 8/1994 |
| JP | 06235320 A | * | 8/1994 |
| JP | A-9-088568 | | 3/1997 |
| JP | A-9-125940 | | 5/1997 |
| JP | A-10-317948 | | 12/1998 |
| JP | A-2000-064833 | | 2/2000 |
| JP | A-2001-012260 | | 1/2001 |
| JP | B2-3230438 | | 11/2001 |
| JP | A-2002-256863 | | 9/2002 |
| JP | A-2002-303164 | | 10/2002 |
| JP | A-2003-083142 | | 3/2003 |
| JP | A-2004-169594 | | 6/2004 |

* cited by examiner

EXHAUST APPARATUS OF AN INTERNAL COMBUSTION ENGINE

FIELD OF THE INVENTION

The present invention relates to an exhaust apparatus of an internal combustion engine, having at least two flow passages for constituting an exhaust flow passage connected to the internal combustion engine, and relates to the exhaust apparatus having a main flow passage with an exhaust processing device disposed therein, and a bypass flow passage with opposite ends thereof communicated with the main flow passage to detour the exhaust processing device, for example.

BACKGROUND ART

As for an exhaust apparatus of an internal combustion engine, in order to minimize emission of HC, NOx or the like by rapid activation of catalyst, when the engine is cold, i.e., in a warm-up period immediately after the engine was started, there is known heretofore such an apparatus that is provided with a start catalytic converter (pre-converter) served as an exhaust processing device, on a main flow passage immediately below an exhaust manifold. Also, the apparatus is provided with a bypass flow passage to detour the device after the warm-up of the engine, and provided with a valve mechanism for switching those flow passages. For example, Patent document 1 proposes such an apparatus that is provided with a catalyst valve for limiting inflow of exhaust into the start catalytic converter (pre-converter) served as the exhaust processing device, and provided with a bypass valve for limiting the inflow of exhaust into the bypass flow passage, to regulate exhaust pressure in response to operating conditions, with those valves being opened or closed independently.

It is concretely described that two valves of the catalyst valve and bypass valve are provided, and that an electromagnetic actuator for opening or closing the catalyst valve, and a diaphragm actuator for opening or closing the bypass valve are controlled independently in response to the operating conditions, as follows: That is, when a heavy load is applied to the internal combustion engine (after the warm-up), the catalyst valve is placed in its closed position, and the bypass valve is placed in its opened position. On the contrary, when the engine is cold (warming-up period), the bypass valve is placed in its closed position, and opening range of the catalyst valve is controlled by its duty. And, when the engine is started, the catalyst valve is placed in its fully opened position, and the bypass valve is placed in its closed position. Furthermore, when a middle or light load is applied after the warm-up, the catalyst valve is placed in its fully opened position, and the bypass valve is placed in its closed position.

Also, Patent document 2 describes, with respect to an exhaust gas recirculation device (EGR) for circulating a part of the exhaust gas of the internal combustion engine into an intake passage, such prior arts as a technology of realizing an internal EGR by a valve timing variable mechanism, and a technology for increasing the exhaust pressure by throttling the exhaust flow rate to activate the catalyst rapidly, and proposes such a device that is aimed to obtain both of the output and the EGR amount on a high level, and discloses the structure with a throttle valve disposed on the downstream side of the catalytic converter.

On the other hand, Patent document 3 discloses an exhaust noise reducing apparatus, which is provided with a bypass passage in an exhaust pipe on the upstream side of a catalyst, and a switching valve in its inlet portion. Also, in Patent document 4, there is proposed an apparatus for reducing exhaust noise, which is provided with bypass exhaust gas volume control means for controlling the bypassed exhaust gas volume in response to exhaust gas temperature, and provided with a volume section having a predetermined capacity. Furthermore, in Patent document 5, there is proposed an apparatus for suppressing deterioration of catalyst, to ensure engine brake by employing such a structure that prohibits a fuel-cut, and throttle an exhaust path according to predetermined conditions.

In the mean time, as for the exhaust processing device, such devices as an exhaust heat recovery device and a heat exchanging device are included, in addition to the catalytic converter or the like as described above. According to those devices, the exhaust process such as heat recovery or heat exchange to the exhaust gas is made according to requirements, which are included in the exhaust processing requirements, together with the exhaust purifying requirements as described before. For example, in Patent document 6, there is proposed an exhaust heat recovery device for an engine, which is aimed to increase exhaust heat quantity by actively promoting heat generation in the catalytic converter, and which is provided with an exhaust heat exchanger for exchanging heat between a heat transfer medium and the exhaust passed through the catalytic converter. And, as its practical structure, it is so constituted that bypass channels are formed in the exhaust heat exchanger, and that the channels are switched by three exhaust channel switching valves. Also, in Patent document 7, there is proposed a heat recovery device for an internal combustion engine, which recovers heat energy at a high efficiency, without causing reduction in power of the internal combustion engine. And, FIG. 8 of it shows an embodiment, which is provided with a valve in a flow passage for bypassing a heat exchange section. It is described that in the case where the exhaust gas is equal to or smaller than a predetermined flow rate, the valve is activated to be closed by biasing means, and that in the case where the exhaust gas has increased to exceed the predetermined flow rate, the valve is opened to provide an opening area determined in proportion to the exhaust gas flow rate.

On the other hand, in Patent document 8, it is pointed out that an exhaust passage is to be throttled by means of an exhaust control valve for controlling inflow of the exhaust gas into an exhaust manifold, in order to increase back pressure of an internal combustion engine, and there is proposed an exhaust apparatus for the internal combustion engine, which is capable of performing various controls by a single exhaust control valve. The apparatus is provided with the exhaust control valve and at least a pair of exhaust gas outlet ports, on the outlet of the exhaust passage connected to an exhaust port of the engine, and the exhaust control valve can be controlled to be placed in at least three positions, i.e., a position where the exhaust gas flowing from the outlet of the exhaust passage is fed into one exhaust gas outlet port, a position where the exhaust gas flowing from the outlet of the exhaust passage is fed into the other exhaust gas outlet port, and a position where the outlet of the exhaust passage is almost fully closed.

Patent Document 1:
Japanese Patent Laid-open Publication No. 9-125940

Patent Document 2:
Japanese Patent Laid-open Publication No. 2003-83142

Patent Document 3:
Japanese Patent Laid-open Publication No. 2002-303164

Patent Document 4:
Japanese Patent Laid-open Publication No. 9-88568

Patent Document 5:
Japanese Patent Laid-open Publication No. 2002-256863

Patent Document 6:
Japanese Patent Laid-open Publication No. 2004-169594

Patent Document 7:
Japanese Patent Laid-open Publication No. 2000-64833

Patent Document 8:
Japanese Patent Laid-open Publication No. 2001-12260

DISCLOSURE OF THE INVENTION

Problems to be Solved by the Invention

However, according to the apparatus as disclosed in the Patent document 1 as listed above, in addition to two valves of the catalyst valve and bypass valve, it has to be provided with the electromagnetic actuator for opening or closing the former valve and the diaphragm actuator for opening or closing the latter valve, and further, it requires a complicated mechanism for controlling those independently. Therefore, it can not meet recent requirements to the vehicle, in any aspects of cost, weight and space. Also, it will be against such a requirement for reducing the number of valves as small as possible, because the valves will act as resistance to cause increase of back pressure. The above-described two valves and two actuators are controlled to be actuated independently, so that a simultaneous control will not be performed, nor mutually related control will be performed, and basically, only the opening or closing (switching) operation will be performed.

Therefore, the control, which is performed by the above-described apparatus in response to driving conditions thereof, has been biased to any one or two of three requirements including an output requirement (performance requirement, back pressure requirement) for the internal combustion engine, an exhaust purifying requirement for a catalytic device such as the pre-converter (catalyst warm-up requirement), and a requirement for muffling the exhaust of the internal combustion engine. For example, when the heavy load is applied (after the warm-up), the catalyst valve is placed in its closed position, so that the exhaust gas will not be introduced into the pre-converter, which has acoustic resistance to act as a muffling body, at all. Consequently, the exhaust noise will be enlarged, and sound volume difference will be created between the cold period and the period after the warm-up, so that the muffling effect will have to be ignored. On the other hand, when the middle or light load is applied after the warm-up, the bypass valve is placed in its closed position, so that the output effect will have to be ignored.

In this respect, if the above-described technologies as disclosed in the prior Patent documents 2-5 are used, the individual requirement could be met, respectively. However, even if these are applied to the apparatus as disclosed in the Patent document 1, the problem will not be solved. For example, the device as recited in the prior Patent document 4 may be useful as a countermeasure to the above-described muffling requirement. However, if it is applied to the apparatus described in the Patent document 1, as it is, a new problem such as enlargement in size will be caused.

On the other hand, with respect to the heat recovery device as described in the prior Patent documents 6 and 7, the muffling effect is questioned. In the Patent document 6, as the bypass passage is provided for the heat recovery device, while a prior sub-muffler has not been disposed, a certain muffling quantity can be obtained, but the muffling quantity will lack when the gas is bypassed. On the contrary, according to the structure in the Patent document 7, the bypass passage acts as a muffler, while a sufficient mounting space is required, because the device is required to be made large enough to obtain a necessary muffling quantity. For example, according to the device disposed under a floor of a vehicle, the sufficient mounting space can not be obtained, so that the necessary muffling quantity can not be ensured. Therefore, even if the heat recovery device is used for the exhaust processing device, it is desired to meet all of the output requirement for the internal combustion engine, exhaust processing requirement for the exhaust heat recovery device, and requirement for muffling the exhaust of the internal combustion engine, according to a simple structure.

Although the exhaust apparatus for performing various controls by the single exhaust control valve is disclosed in the Patent document 8, and it is provided for throttling the exhaust passage so as to increase the back pressure in the internal combustion engine, and it is so constituted to select the three positions including the position where the exhaust gas flowing from the outlet of the exhaust passage is fed into one exhaust gas outlet port, the position where the exhaust gas flowing from the outlet of the exhaust passage is fed into the other exhaust gas outlet port, and the position where the outlet of the exhaust passage is almost fully closed. Therefore, it can not appropriately meet all of the output requirement for the internal combustion engine, the exhaust processing requirement by the heat recovery device, and the requirement for muffling the exhaust of the internal combustion engine.

Accordingly, in an exhaust apparatus of an internal combustion engine, having at least two flow passages for constituting an exhaust passage connected to the internal combustion engine, a problem to be solved in the present invention is to provide the exhaust apparatus capable of performing a changeover of flow passage by a single valve member, and appropriately regulating each flow area. Particularly, in the exhaust apparatus having the main flow passage with the exhaust processing device disposed therein, and a bypass flow passage with opposite ends thereof communicated with the main flow passage to detour the exhaust processing device, the problem to be solved in the present invention is to provide the exhaust apparatus capable of performing the changeover of flow passage between the main flow passage and the bypass flow passage by the single valve member, and appropriately regulating each flow area.

Also, in the exhaust apparatus of the internal combustion engine as described above, the problem to be solved in the present invention is to provide the exhaust apparatus which can appropriately meet all of the output requirement for the internal combustion engine, the exhaust processing requirement by the exhaust processing device, and the requirement for muffling the exhaust of the internal combustion engine.

Means for Solving the Problems

To solve the above-described problems, according to the present invention, in an exhaust apparatus of an internal combustion engine having at least two flow passages for constituting an exhaust flow passage connected to the internal combustion engine, it is provided with a single valve member for selecting communication of one of said two flow passages, and continuously providing a flow passage area of the selected one of said two flow passages. Particularly, the one of said two flow passages may be provided for a main flow passage, and the other one of said two flow passages may be provided for a bypass flow passage, with opposite ends thereof being communicated with said main flow passage, and an exhaust processing device may be disposed in at least one of said main flow passage and said bypass flow passage, with said single valve member being disposed on one of the upstream side and the downstream side of said exhaust processing device, and said single valve member may select communication of one of said main flow passage and said bypass flow passage, and continuously provide the flow passage area of the selected one of said main flow passage and said bypass flow passage. Furthermore, said exhaust processing device may be the one to be disposed in said main flow passage, with opposite ends of said bypass flow passage being communicated with said main flow passage to detour said exhaust processing device, and said single valve member may be disposed on one of the upstream side and the downstream side of said exhaust processing device. In this connection, the exhaust processing device used herein includes not only a catalytic device, but also heat recovery device, heat exchange device, muffler and so on.

In the exhaust apparatus as described above, said single valve member may be so constituted that when said single valve member begins to move from such a state that said main flow passage provides an maximal flow passage area thereof and that said bypass flow passage is closed, said valve member continuously reduces said main flow passage in response to a continuous movement of said valve member, and said valve member continues to place said bypass flow passage in the closed state thereof, until the flow passage area of said main flow passage is enlarged to reach a first flow passage area, and thereafter continuously enlarges the flow passage area of said bypass flow passage, and that when said valve member begins to move from such a state that said bypass flow passage provides an maximal flow passage area thereof and that said main flow passage is closed, said valve member continuously reduces said bypass flow passage in response to a continuous movement of said valve member, and said valve member continues to place said main flow passage in the closed state thereof, until the flow passage area of said bypass flow passage is reduced to reach a second flow passage area, and thereafter continuously enlarges the flow passage area of said main flow passage. Particularly, said first flow passage area may be set to be a minimal flow passage area as required for said exhaust processing device, and said second flow passage area may be set to be substantially zero.

And, said exhaust processing device may be constituted by a start catalytic converter which is disposed on the immediate downstream side of said internal combustion engine, and said single valve member may be disposed on the downstream side of said start catalytic converter. In each exhaust apparatus as described above, said single valve member may comprise a valve body having a cross section of a folding fan shape, with a hinge portion thereof provided for an axis of rotation to be rotatably mounted on a connected section between said main flow passage and said bypass flow passage, and a peripheral wall surface of said valve body may be disposed to slide on inner wall surfaces of said main flow passage and bypass flow passage.

Also, according to the present invention, in an exhaust apparatus of an internal combustion engine having a main flow passage for constituting an exhaust flow passage connected to said internal combustion engine, with an exhaust processing device being disposed in said main flow passage, and a bypass flow passage with opposite ends thereof being communicated with said main flow passage to detour said exhaust processing device, it may be constituted by a single valve member disposed on one of the upstream side and the downstream side of said exhaust processing apparatus, and provided for selecting communication of one of said two flow passages, and continuously providing a flow passage area of the selected one of said two flow passages, and control means for controlling said single valve member to be actuated in response to a driving state of said internal combustion engine, to switch the flow passages between said main flow passage and said bypass flow passage, and regulate each flow passage area of said main flow passage and said bypass flow passage.

In the above-described exhaust apparatus, it may be so constituted that when said single valve member begins to move from such a state that said main flow passage provides an maximal flow passage area thereof and that said bypass flow passage is closed, said valve member continuously reduces said main flow passage in response to a continuous movement of said valve member, and said valve member continues to place said bypass flow passage in the closed state thereof, until the flow passage area of said main flow passage is enlarged to reach a first flow passage area, and thereafter continuously enlarges the flow passage area of said bypass flow passage, and that when said valve member begins to move from such a state that said bypass flow passage provides an maximal flow passage area thereof and that said main flow passage is closed, said valve member continuously reduces said bypass flow passage in response to a continuous movement of said valve member, and said valve member continues to place said main flow passage in the closed state thereof, until the flow passage area of said bypass flow passage is reduced to reach a second flow passage area, and thereafter continuously enlarges the flow passage area of said main flow passage. Also, said control means may control said single valve member to be actuated in response to the driving state of said internal combustion engine, to meet all of an output requirement for said internal combustion engine, an exhaust processing requirement for said exhaust processing device, and a requirement for muffling exhaust of said internal combustion engine.

For example, in the case where said exhaust processing device is the catalytic device, it may be so constituted that when said internal combustion engine is cold, said control means gives priority to requirements for purifying exhaust gas, so that said control means controls said single valve member to be actuated to meet said exhaust processing requirement, and regulates the flow passage area of said main flow passage, and that, after said internal combustion engine was warmed up, said control means switches the flow passage into said bypass flow passage, and controls said single valve member to be actuated to meet said output requirement and said muffling requirement, and regulates the flow passage area of said bypass flow passage. And, said catalytic device may be provided by a start catalytic converter which is disposed on the immediate downstream side of said internal combustion engine, and said single valve member may be disposed on the downstream side of said start catalytic converter.

EFFECTS OF THE INVENTION

As the present invention is constituted as describe above, the following effects can be achieved. That is, according to the single valve member, in such a state that communication of one of the flow passages is selected, its flow passage area can be provided optionally and continuously. Therefore, the changeover of flow passage between two flow passages can be achieved, and each flow area can be appropriately regulated. For example, according to the single valve member disposed on one of the upstream side and downstream side of the exhaust processing device, in such a state that communication of one of the main flow passage and the bypass flow passage is selected, its flow passage area can be provided optionally and continuously. Therefore, the changeover of flow passage between the main flow passage and the bypass flow passage can be achieved, and each flow area can be appropriately regulated. Consequently, it is privileged in space, cost, weight, back pressure reducing effects or the like, comparing with the prior exhaust apparatus. Also, from the cold state until the state after warming-up of the internal combustion engine, it can appropriately meet all of the output requirement for the internal combustion engine, the exhaust processing requirement for the exhaust processing device, and the requirement for muffling the exhaust of the internal combustion engine. Particularly, it can be easily and appropriately applied to the start catalytic converter. And, if said single valve member is formed with the valve body having the cross section of the folding fan shape, the apparatus can be made easily and inexpensively, so that a small and inexpensive apparatus can be provided.

Also, according to the single valve member and control means, all of the output requirement for the internal combustion engine, the exhaust processing requirement for the exhaust processing device, and the requirement for muffling the exhaust of the internal combustion engine can be appropriately met, and even a braking requirement can be appropriately met. And, a priority for each requirement in the driving state of the internal combustion engine can be given, most appropriate changeover of flow passage and regulating the flow passage area can be achieved, and the exhaust control adapted to all of the output requirement, the exhaust processing requirement (exhaust purifying requirement), and the muffling requirement can be performed smoothly and certainly. Particularly, the control of the start catalytic converter can be performed easily and appropriately.

DESCRIPTION OF CHARACTERS

Figure 1:
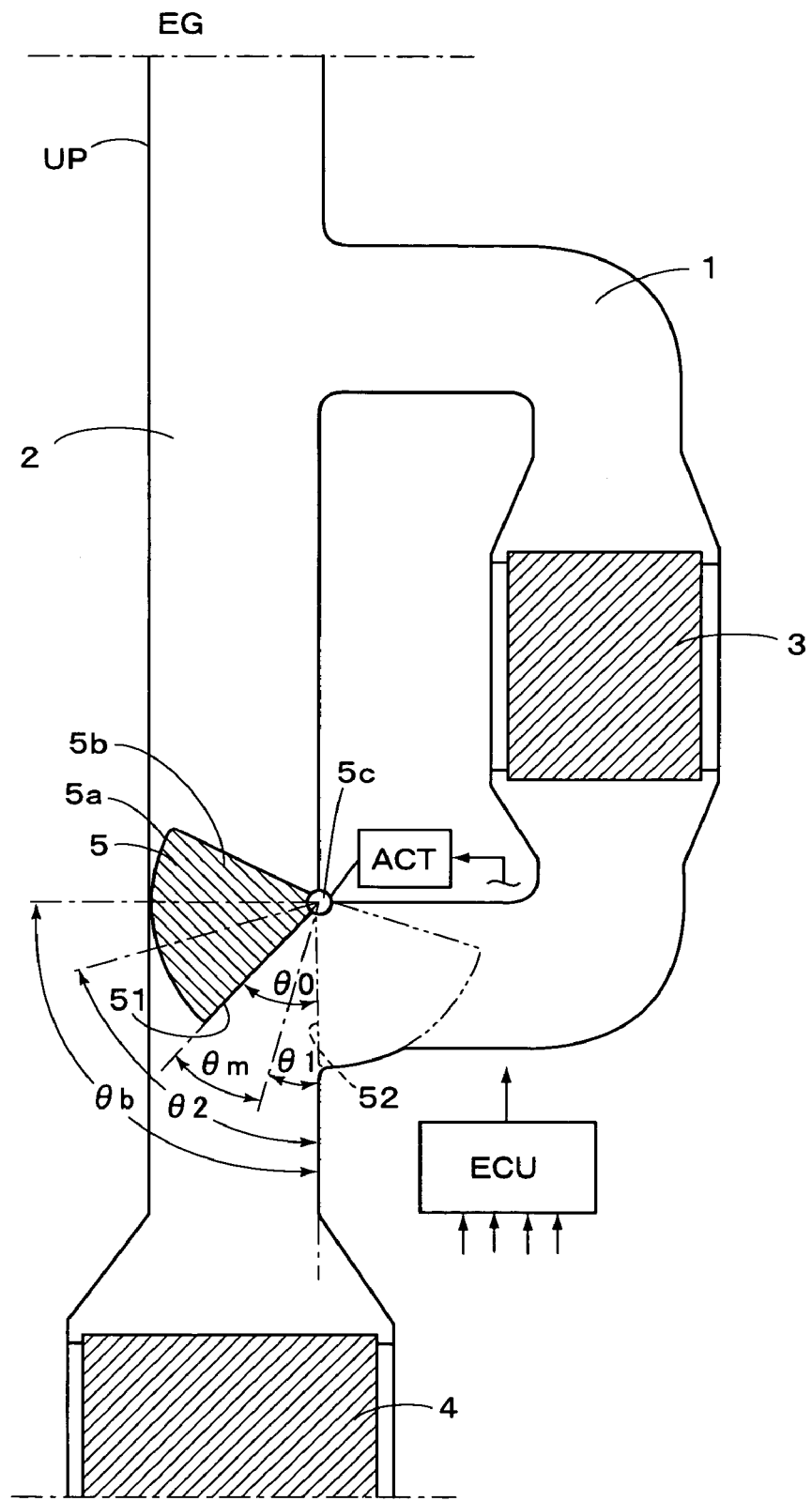
[FIG. 1] is a cross sectional view enlarging a part of an exhaust apparatus according to an embodiment of the present invention.

1: main flow passage
2: bypass flow passage
3: start catalytic converter
4: main catalytic converter
5: valve member
7: heat exchanger
EG: internal combustion engine
UP,DP: exhaust pipes
MM: main muffler
SM: sub muffler

BEST MODE FOR CARRYING OUT THE INVENTION

Figure 21:
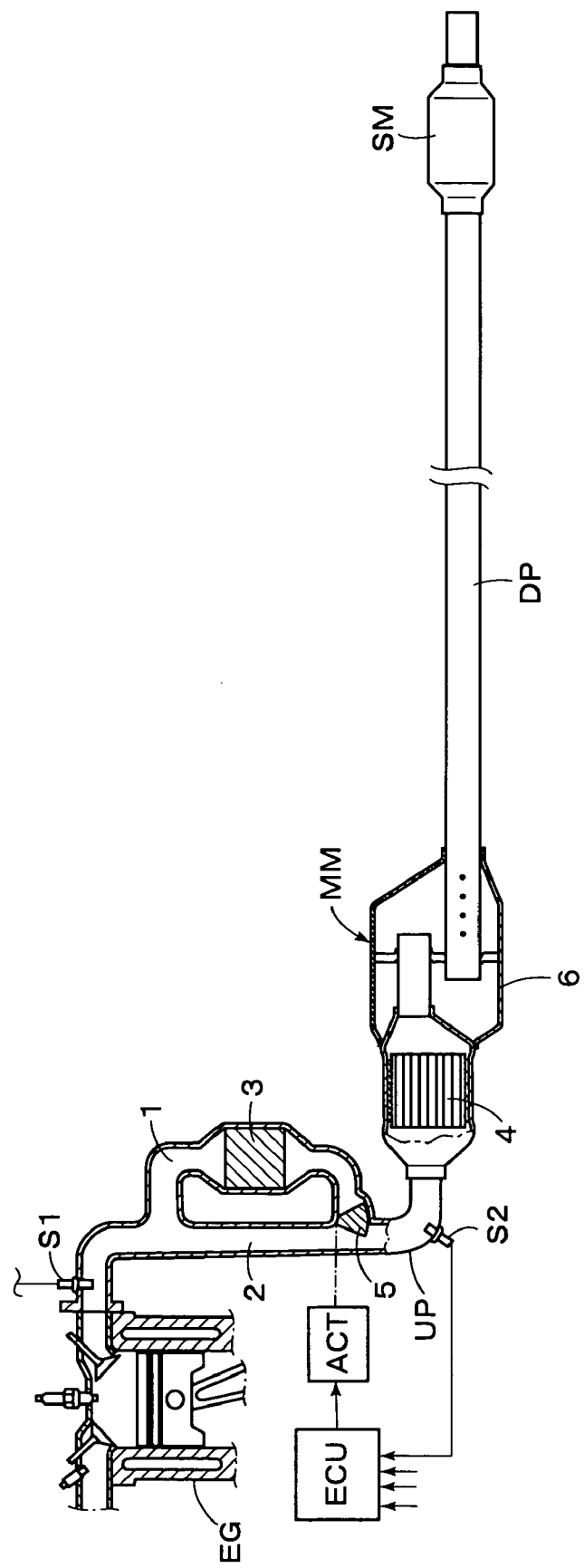
[FIG. 21] is a cross sectional view showing an overall structure of an exhaust apparatus according to an embodiment of the present invention, installed in an internal combustion engine.

Hereinafter, will be explained a desirable embodiment of the present invention, referring to drawings. FIG. 1 shows an enlarged view of a main structure of an exhaust apparatus of an internal combustion engine according to an embodiment of the present invention, and FIG. 21 shows an overall structure of the exhaust apparatus. At the outset, referring to FIG. 21, an upstream exhaust pipe UP connected to an internal combustion engine EG is divided into a main flow passage 1 and a bypass flow passage 2, and a start catalytic converter 3 (hereinafter, called as pre-converter 3) as a catalytic device served as an exhaust processing device according to the present invention, is disposed is the main flow passage 1. Furthermore, the exhaust pipe UP is connected to a main catalytic converter 4 (hereinafter, called as main converter 4), with its rear end portion fitted into a muffler 6, to form a main muffler MM. This main muffler MM is connected to a sub muffler SM disposed rearward of a vehicle, through an exhaust pipe DP. And, oxygen sensors S1 and S2 are disposed on the positions as show in FIG. 21, for example.

Figure 16:
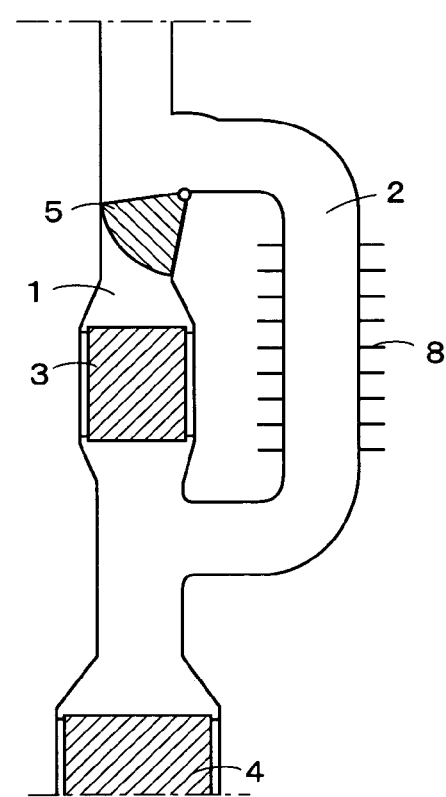
[FIG. 16] is a cross sectional view enlarging a part of an exhaust apparatus according to a yet further embodiment of the present invention.

Next, the structure in the vicinity of the pre-converter 3 will be explained in detail, referring to FIG. 1. The exhaust pipe UP according to the present embodiment is formed in such a shape that the main flow passage 1 formed in a curved pipe is connected to the bypass flow passage 2 formed in a straight pipe. This is an embodiment of such a structure that opposite ends of the bypass flow passage 2 are connected to the main flow passage 1 with the pre-converter 3 disposed therein, so as to detour the pre-converter 3. Instead, it may be so constituted that the main flow passage 1 formed in a straight pipe is connected to the bypass flow passage 2 formed in a curved pipe, an example of which is shown in FIG. 16 and will be explained later. According to the present embodiment, it is aimed to improve a performance of the internal combustion engine EG by reducing a back pressure when the exhaust gas is bypassed, so that a part of the bypass flow passage 2 between its branch section and its confluent section is formed to be approximately straight, as shown in FIG. 1.

The pre-converter 3 is of a small volume, to be activated rapidly (i.e., reached to a temperature for acting a catalyst), so that a gas purifying function can be effective even when the internal combustion engine EG is cold. And, the main converter 4 is connected to the exhaust pipe UP on the downstream side of the pre-converter 3, so that the high temperature reactive gas exhausted from the pre-converter 3 is introduced into the main converter 4, to be contributed to its rapid activation. As for the pre-converter 3, it may be formed in a double layer structure, for example, so as to insulate the heat between its inner and outer layers and reduce the heat mass of its inner layer.

Then, according to the present embodiment, a single valve member 5 is disposed on the downstream side of the pre-converter 3. The single valve member 5 of the present embodiment comprises a valve body 5b having a cross section of a folding fan shape, whose hinge portion is provided for an axis 5c to be rotatably mounted on a connected section between the main flow passage 1 and the bypass flow passage 2, and the valve body 5b is disposed so that its outer peripheral wall surface 5a is slidable on an inner wall surface of the main flow passage 1 and an inner wall surface of the bypass flow passage 2. The valve member 5 is so constituted that when the valve member 5 begins to move from such a state that the main flow passage 1 provides its maximal flow passage area and that the bypass flow passage 2 is placed in its closed state (such a state that an outer side surface 51 of the valve member 5 on its main flow passage 1's side is positioned to provide an angle $\theta 0$ against the vertical plane of the exhaust pipe UP, as shown by a solid line in FIG. 1), the valve member 5 continuously reduces the main flow passage 1 in response to a continuous movement (rotation) of the valve member 5, and the valve member 5 continues to place the bypass flow passage 2 in its closed state, until the flow passage area of the main flow passage 1 is enlarged to reach a first flow passage area (until such a state that the outer side surface 51 of the valve member 5 is positioned to provide an angle $\theta 1$ against the vertical plane of the exhaust pipe UP, in FIG. 1), and thereafter continuously enlarges the flow passage area of the bypass flow passage 2.

Also, the valve member 5 is so constituted that when the valve member 5 begins to move from such a state that the bypass flow passage 2 provides its maximal flow passage area and that the main flow passage 1 is placed in its closed state (such a state that an outer side surface 52 of the valve member 5 on its bypass flow passage 2's side is positioned to be on the same plane with the vertical plane of the exhaust pipe UP, as shown by a two-dotted chain line in FIG. 1), the valve member 5 continuously reduces the bypass flow passage in response to a continuous movement (rotational movement) of the valve member 5, and the valve member 5 continues to place the main flow passage 1 in its closed state, until the flow passage area of the bypass flow passage 2 is reduced to reach a second flow passage area (until such a state that the outer side surface 52 of the valve member 5 is positioned to provide an angle $\theta 2$ (=90°−$\theta 1$) against the vertical plane of the exhaust pipe UP, in FIG. 1), and thereafter continuously enlarges the flow passage area of the main flow passage 1.

Figure 7:
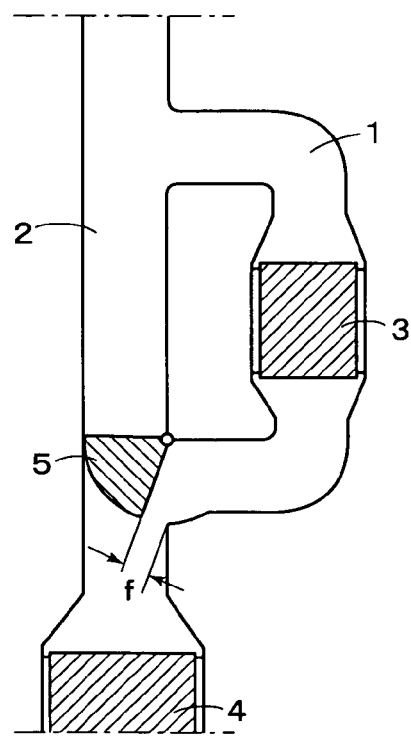
[FIG. 7] is a cross sectional view showing an operating state of a valve member according to an embodiment of the present invention.

Thus, it is so constituted that the changeover of flow passage (opening or closing) between the main flow passage 1 and the bypass flow passage 2 is performed, and regulation of each flow passage area of the main flow passage 1 and the bypass flow passage 2 is performed. And, it is so constituted that the flow passage area of the main flow passage 1 can be varied to be regulated within a range of the rotational angle $\theta m$ of the valve member 5, and the flow passage area of the bypass flow passage 2 can be varied to be regulated within a range of the rotational angle $\theta b$ of the valve member 5. In this respect, the first flow passage area (the flow passage area provided when the outer side surface 51 of the valve member 5 is positioned at the angle $\theta 1$) corresponds to the minimal requiring flow passage area for the pre-converter 3, and the flow passage area of the valve member 5 positioned (as shown in FIG. 7) when a fuel-cut as described later is made. And, the second flow passage area in the present embodiment corresponds to the flow passage area of the bypass flow passage 2 obtained at that time. As the valve member 5 is placed in its closed state against the bypass flow passage 2 (as shown in FIG. 7), the second flow passage area is approximately zero.

The above-described valve member 5 is connected to an actuator ACT, which is controlled by an electronic controller ECU served as the control means in the present invention, to be actuated in response to the driving state of the internal combustion engine EG. The actuator ACT is provided with a step motor (not shown), for example, which is driven to be precisely rotated or held by the electronic controller ECU. According to the electronic controller ECU, the driving state of the internal combustion engine EG, operating state of an accelerator pedal (not shown) or the like by the vehicle driver, and vehicle posture or braking state are watched, on the basis of signals detected by various sensors (pressure sensor, water temperature sensor, rotation sensor, accelerator operation sensor, and etc.) including the aforementioned oxygen sensors S1 and S2 (FIG. 21). Then, the most appropriate position of the valve member 5 at that moment is determined at a certain cycle, and the driving signal for the step motor is output, so that the valve member 5 is rotated up to that position, or stopped at that position. Further, it is recommendable that a map is prepared on the basis of the relationship between the various detected signals or watched information and the most appropriate position for actuating the valve member 5, and stored in a memory (not shown) of the electronic controller ECU, and that the map will be read when necessary, to perform a map control.

Therefore, according to the electronic controller ECU, the valve member 5 is controlled to be actuated to meet all of the output requirement (performance requirement) for the internal combustion engine EG, the exhaust purifying requirement for the pre-converter 3 or the like and the requirement for muffling the exhaust of the internal combustion engine EG. Particularly, when the internal combustion engine EG is cold, the priority is given to the requirement for purifying the exhaust by the pre-converter 3 or the like, so that the valve member 5 is controlled to be actuated to meet the exhaust purifying requirement, to regulate the flow passage area of the main flow passage 1. After the internal combustion engine EG was warmed up, the flow passage is switched to the bypass flow passage 2, and the valve member 5 is controlled to be actuated to meet the output requirement and the muffling requirement, and the flow passage area of the bypass flow passage 2 is regulated. Hereinafter, will be explained operation of the exhaust apparatus of the present embodiment in sequence, according to the driving state of the internal combustion engine EG.

Figure 2:
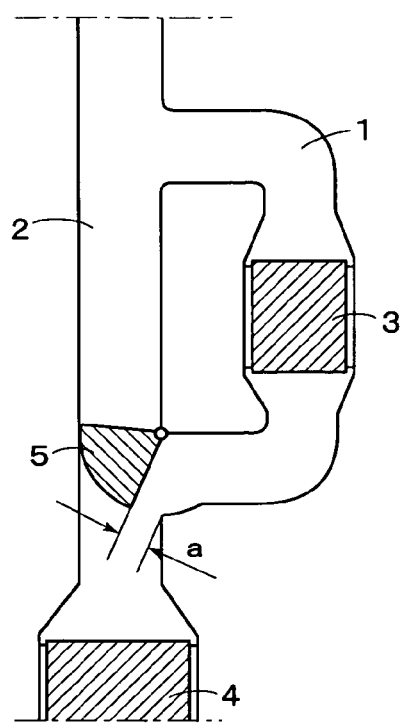
[FIG. 2] is a cross sectional view showing an operating state of a valve member according to an embodiment of the present invention.

At the outset, when the internal combustion engine EG is cold, as the priority is given to the exhaust purifying requirement, the bypass flow passage 2 is made by the valve member 5 to be in its closed state as shown in FIG. 2, whereby the exhaust flow passage is switched to the main flow passage 1. Therefore, every exhaust gas is introduced into the main flow passage 1, and processed by the pre-converter 3, and then processed by the main converter 4.

Figure 3:
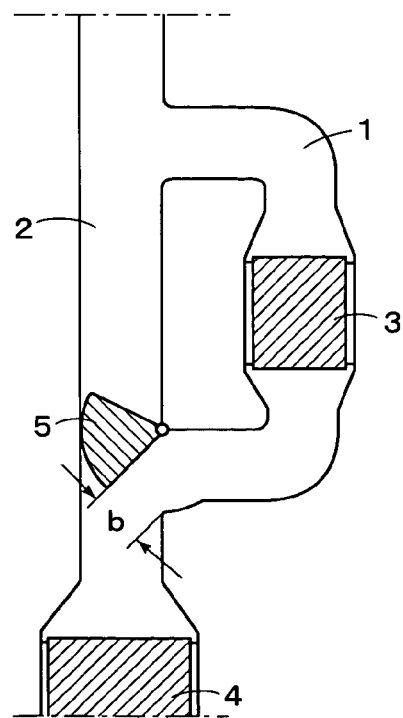
[FIG. 3] is a cross sectional view showing an operating state of a valve member according to an embodiment of the present invention.

Furthermore, according to the present embodiment, the valve member 5 is actuated to regulate the flow passage area of the main flow passage 1 so as to meet the output requirement and the muffling requirement, with the bypass flow passage 2 being maintained to be placed in its closed state. For example, a clearance "b" between the valve member 5 and the main flow passage 1 in FIG. 3 has been made broader than a clearance "a" between the valve member 5 and the main flow passage 1 in FIG. 2, so that the flow passage area provided for the main flow passage 1 is regulated to be enlarged. Consequently, "flow rate regulating function" is achieved by the valve member 5. In other words, the clearance "a" between the valve member 5 and the main flow passage 1 in FIG. 2 has been made narrower than the clearance "b" between the valve member 5 and the main flow passage 1 in FIG. 3, so that the flow passage area provided for the main flow passage 1 is regulated to be reduced. That is, "throttling function" is achieved by the valve member 5 in the state as shown in FIG. 2, comparing with the state as shown in FIG. 3, to perform a back pressure regulation. Further, as the valve member 5 can be actuated in a step-less manner without being limited to the state as shown in FIGS. 2 and 3, the flow passage area of the main flow passage 1 can be regulated optionally, with the bypass flow passage 2 being maintained to be placed in its closed state.

Accordingly, even when the engine is cold (warming-up period), the output requirement or the muffling requirement is varied in response to the vehicle driving state or the operation by the vehicle driver. According to the present embodiment, the back pressure regulation and the flow rate regulation can be made optionally and continuously, in response to the output requirement and the muffling requirement. For example, in the case where the back pressure (pressure loss) is increased to activate reaction in the pre-converter 3, or the case where the internal EGR amount in the internal combustion engine EG is increased to raise the exhaust temperature, to accelerate the rapid activation, the flow passage area may be set to be relatively small (i.e., the throttling rate is set to be relatively large) as shown in FIG. 2. Also, in the case where the muffling effect is to be increased, the relatively small flow passage area (i.e., the relatively large throttling rate) is effective. However, as a matter of antinomy, the output of the internal combustion engine EG is reduced. Therefore, it is important that the control map with a balance being taken into consideration is to be provided. On the contrary, even when the engine is cold, the flow passage area may be set to be maximum as shown in FIG. 3, at the end of the warming-up period, or in the case where the priority is given to the output requirement (intentionally, even when the engine is cold). In this case, may be prepared such a map that can be provided in response to the operation by the vehicle driver (accelerator operating level, acceleration or the like) or the vehicle state. As described above, the most appropriate integrated control with the output requirement and the muffling requirement being taken into consideration can be performed, giving the most priority to the purifying requirement which is essential when the engine is cold.

Figure 4:
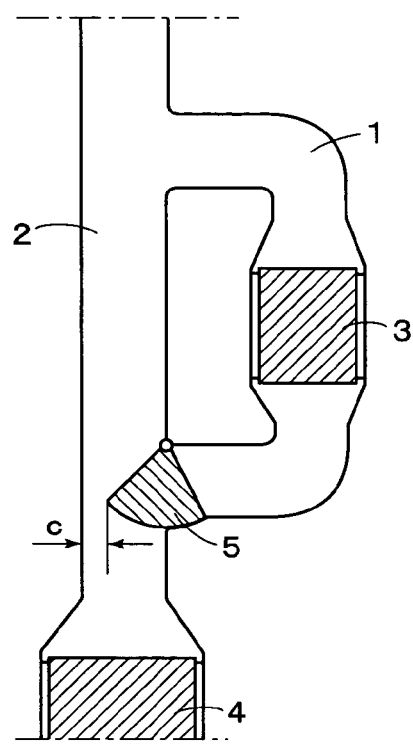
[FIG. 4] is a cross sectional view showing an operating state of a valve member according to an embodiment of the present invention.
Figure 5:
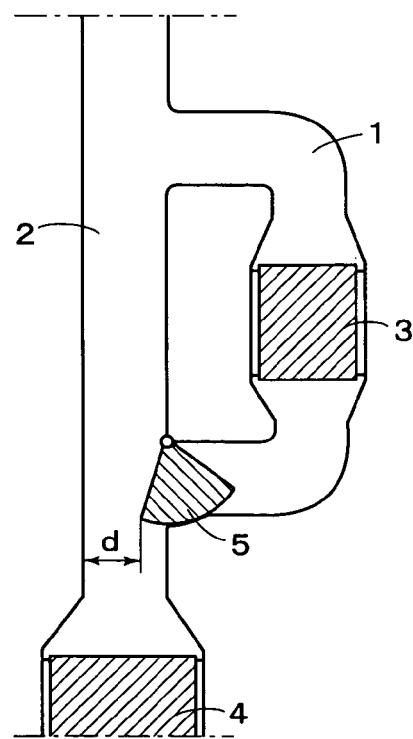
[FIG. 5] is a cross sectional view showing an operating state of a valve member according to an embodiment of the present invention.
Figure 6:
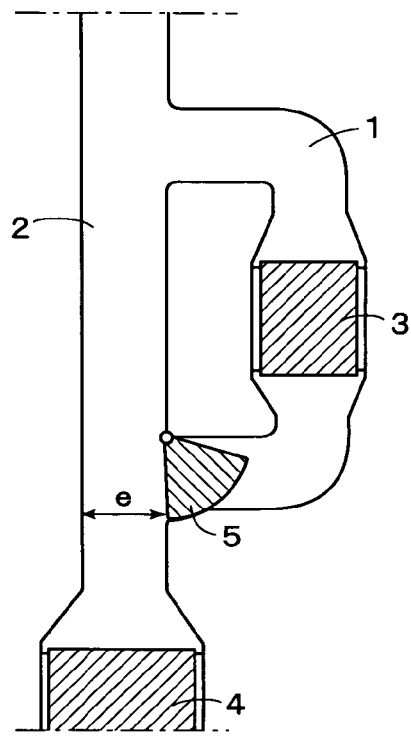
[FIG. 6] is a cross sectional view showing an operating state of a valve member according to an embodiment of the present invention.

Next, after the warm-up of the internal combustion engine EG, as both catalytic converters have been already warmed up, a normal purifying performance can be achieved, the priority is given to the output requirement of the internal combustion engine EG, the main flow passage 1 is closed by the valve member 5, to switch the exhaust flow passage to the bypass flow passage 2. Therefore, every exhaust gas is introduced into the bypass flow passage 2, and then introduced into the main converter 4, as it is. In this case, the flow passage area of the bypass flow passage 2 is regulated by actuating the valve member 5 to meet the output requirement and the muffling requirement, with the main flow passage 1 being maintained to be placed in its closed state. For example, as shown in FIG. 4 (clearance "c") or FIG. 5 (clearance "d"), the flow passage area of the bypass flow passage 2 is regulated to be smaller than the maximal flow passage area as shown in FIG. 6 (clearance "e").

After the warm-up of the internal combustion engine EG, when the heavy load (high rotation) is applied, the priority is given to the output requirement of the internal combustion engine EG. Therefore, it is desirable to place the bypass flow passage 2 in the state as shown in FIG. 6 so as to obtain its maximal flow passage area. Furthermore, according to the present embodiment, even when the middle or light load (low rotation) is applied, the priority may be given to the output requirement of the internal combustion engine EG, so that the bypass flow passage 2 is used effectively. That is, once the internal combustion engine EG has been warmed up, every exhaust gas is introduced into the bypass flow passage 2, and the valve member 5 is controlled to be actuated on the basis of the map control with the output requirement and the muffling requirement being taken into consideration, whereby the flow passage area, which is most appropriate to the driving state, is obtained for the bypass flow passage 2, in sequence (at real time). For example, in case of the middle or light load (low rotation), the priority is given to the muffling requirement rather than the output requirement of the internal combustion engine EG, to provide the flow passage area of the bypass flow passage 2 to be smaller than its maximal flow passage area (in a direction for throttling the flow passage). In this case, when the power of the internal combustion engine EG is suddenly required, the flow passage area of the bypass flow passage 2 is appropriately increased (reducing the throttling amount), or such an interrupt of the control that provide the maximal flow passage area as shown in FIG. 6 is performed. All of those controls can be performed by the single valve member 5 smoothly and continuously.

Thus, as a so-called "throttle control" for regulating the flow passage area of the bypass flow passage 2 can be performed, the sectional area (i.e., maximal flow rate) of the bypass flow passage 2 may be provided simply on the basis of the maximal value of the output requirement of the internal combustion engine EG, thereby to solve such a problem that the output requirement can not be met, due to shortage of the flow rate caused when the heavy load (high rotation) is applied. That is, the sectional area of the bypass flow passage 2 is provided on the basis of the output requirement, and the muffling requirement can be met through the throttle control of the bypass flow passage 2 by the valve member 5. Furthermore, according to the present embodiment, as the muffling can be made by actively performing the throttle control of the bypass flow passage 2, it is not required to provide a muffler of a large volume as required in the past. That is, as such a muffler as shown in FIG. 21 is sufficient (the main muffler MM is formed to be as small in size as the prior sub-muffler), its assembling performance in the vehicle is largely improved, and reduction in weight and cost can be made, as well.

On the other hand, when the vehicle is in such a state that its speed is being reduced, and then the fuel-cut is made to the internal combustion engine EG, the flow passage area of the main flow passage 1 is regulated by actuating the valve member 5, to ensure the minimal flow passage area for the pre-converter 3 and therefore the internal combustion engine EG, with the bypass flow passage 2 being placed in its closed state, as shown in FIG. 7. According to a conventional vehicle, when the operation of the accelerator pedal (not shown) is released, the engine brake is created, and if the fuel-cut is made in response to the driving state, much larger engine brake will be created. In this case, the internal combustion engine EG rotates (motoring) without explosion being made, expansive air will be discharged a little into the pre-converter 3. Consequently, cavity noise (standing wave) is created to cause a so-called deceleration noise (booming noise) of low frequency. In this case, the throttle control of the main flow passage 1 by the control valve 5 can be worked effectively. That is, as propagation of an input from a vibration generator (pulsation wave resulted from the expansive air) to its downstream side can be forcedly prevented, and also it can be made at the upstream position immediately after the internal combustion engine EG, so that the deceleration noise can be prevented from being generated in the exhaust apparatus as a whole.

Then, as the air itself has to be exhausted so as to avoid stopping the internal combustion engine EG, the main flow passage 1 can not be fully closed by the valve member 5, so that the minimal requiring flow passage area (minimal clearance (f)) has to be provided. In this case, as the pre-converter 3 is also an acoustic resistance member, it will be contributed to damping of the pulsation wave. In the prior exhaust apparatuses, it was necessary to provide a large volume of resonance chamber (generally, in the rear main muffler) so as to cancel the deceleration noise of low frequency as described above. According to the present embodiment, that large resonance chamber is not required, so that the space and weight for it can be reduced. Furthermore, as the air flow itself is throttled by the control at the time of deceleration, to create the pressure loss, the engine brake quantity will be increased. That is, by that control, it will be made possible to increase the braking force irrespective of the braking operation by the vehicle driver. Therefore, the control made by the valve member 5 at the time of deceleration can be provided, as one of auxiliary braking means, for the cooperative control with other control apparatuses such as a vehicle stability control apparatus (VSC), brake control apparatus (ABS and etc.), control apparatus in a driving system, and regenerative braking apparatus, for example.

In the case where the internal combustion engine EG restarts the operation with the explosion being made after the fuel-cut (in case of recovery), the valve member 5 is controlled to be immediately retracted to such a position that a desired flow passage area can be obtained in response to the driving state at that time. In case of deceleration without the fuel-cut being made intentionally, the control made at the time of deceleration by the valve member 5 (exhaust throttle) is especially effective, as means for adding the engine brake amount. Furthermore, according to the control made at the time of deceleration, the pre-converter 3 heated at high temperature in the warm-up period will be cooled, so that it is effective for preventing deterioration when it is not used.

Figure 8:
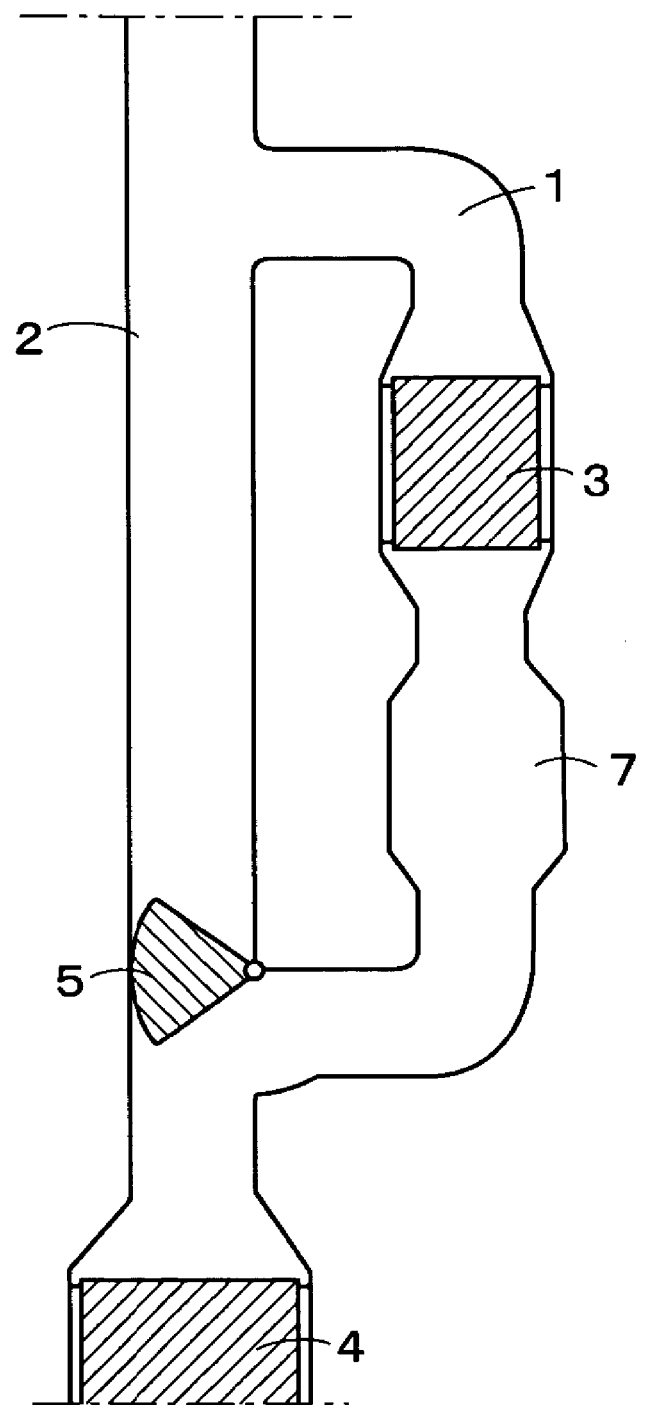
[FIG. 8] is a cross sectional view enlarging a part of an exhaust apparatus according to another embodiment of the present invention.
Figure 9:
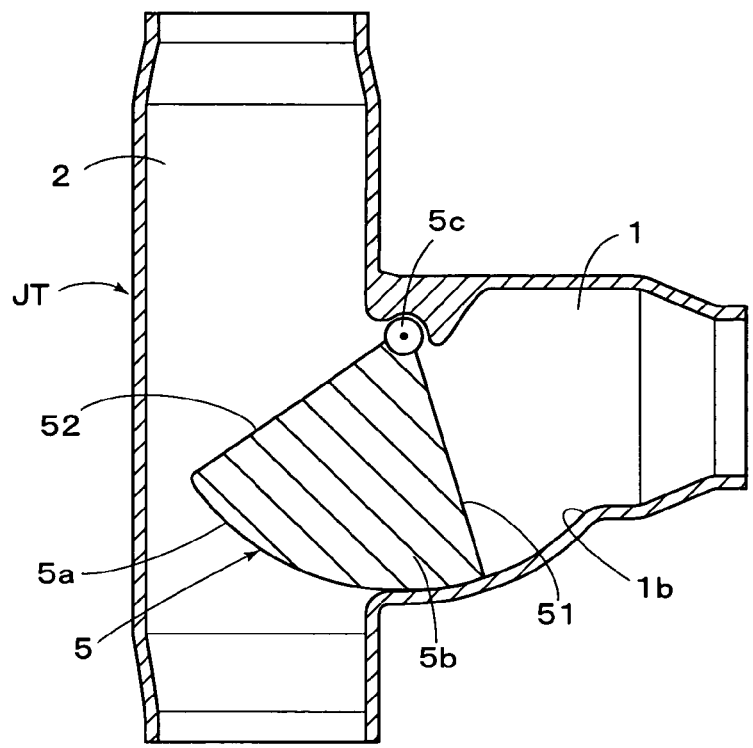
[FIG. 9] is a cross sectional view showing an operating state of a concrete structural example of a valve member according to an embodiment of the present invention.
Figure 10:
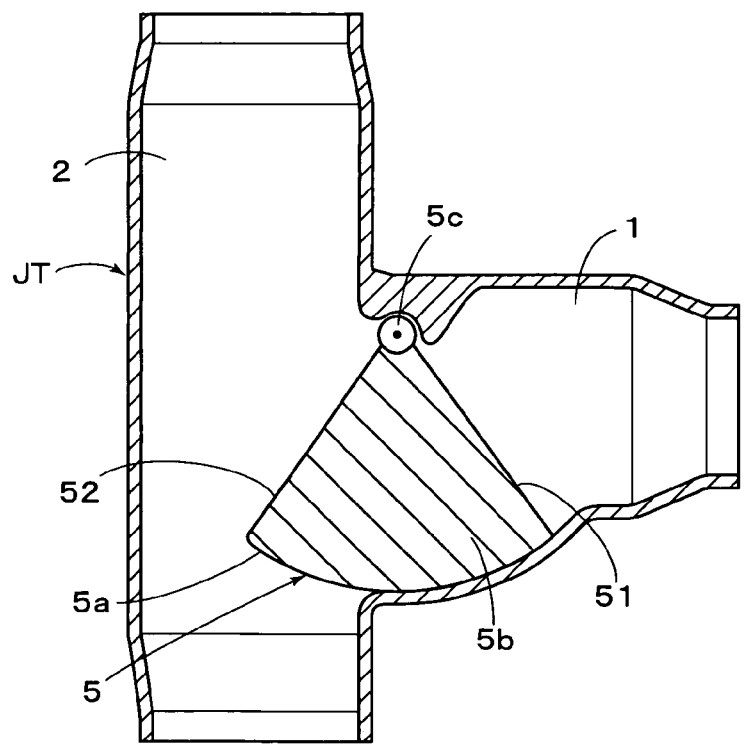
[FIG. 10] is a cross sectional view showing an operating state of a concrete structural example of valve member according to an embodiment of the present invention.
Figure 11:
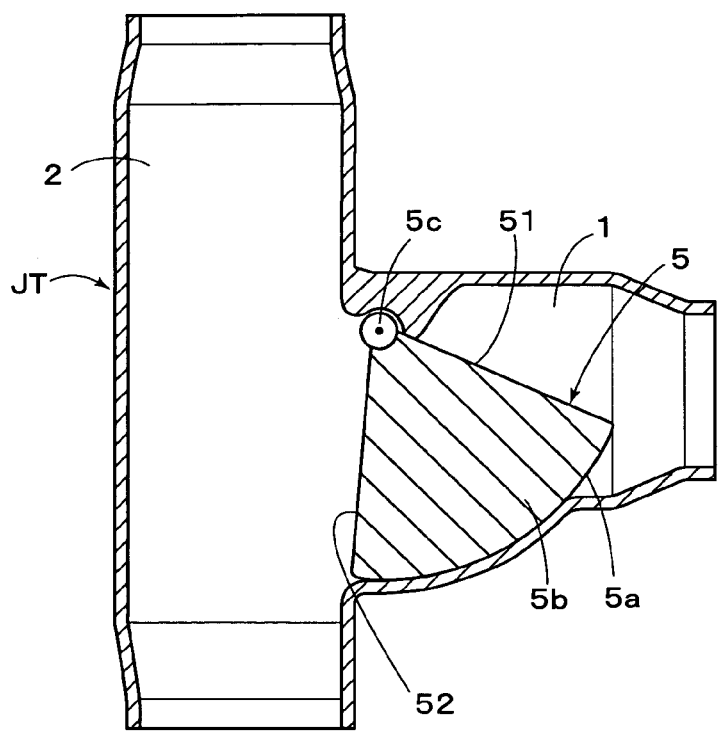
[FIG. 11] is a cross sectional view showing an operating state of a concrete structural example of valve member according to an embodiment of the present invention.
Figure 12:
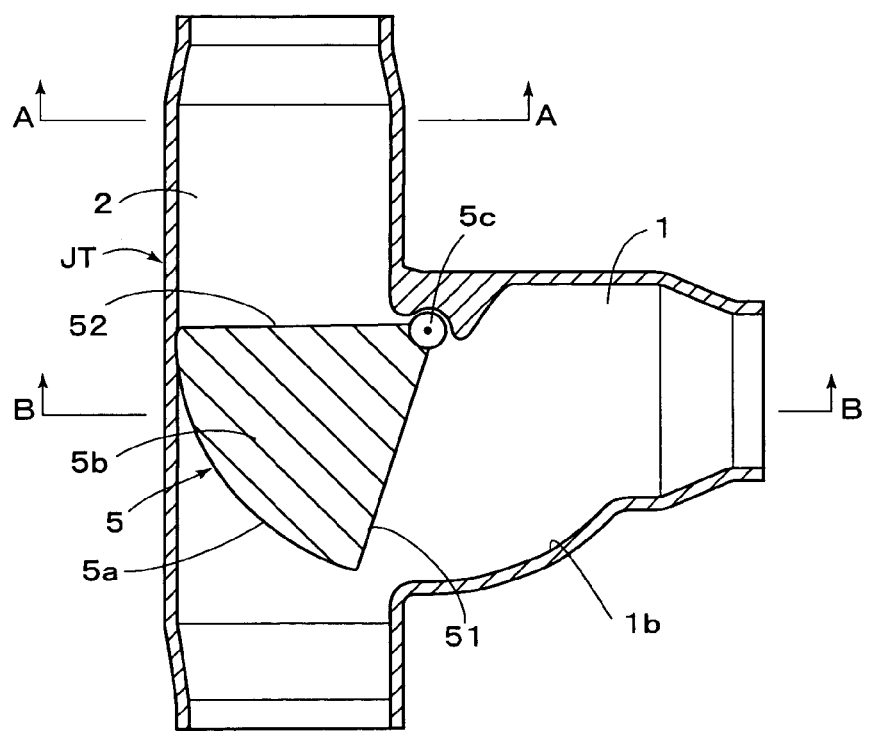
[FIG. 12] is a cross sectional view showing an operating state of a concrete structural example of valve member according to an embodiment of the present invention.

FIG. 8 shows another embodiment of the present invention, wherein a volume 7 (volume section having expansion element and reduction element) is disposed on the immediate downstream side of the pre-converter 3. The volume 7 provides the volume (volume section having expansion element and reduction element) between two catalytic substrates of the pre-converter 3 and the main converter 4, so that the muffling effect (attenuation) can be achieved throughout almost all frequency zones, without deteriorating the output performance of the internal combustion engine and the purifying performance. Particularly, when the internal combustion engine EG is cold, the muffling effect can be achieved against the increase of noise according to a variable control of valve timing.

Figure 13:
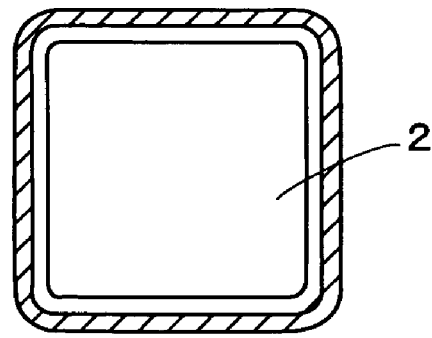
[FIG. 13] is a cross sectional view sectioned along A-A line in FIG. 12.
Figure 14:
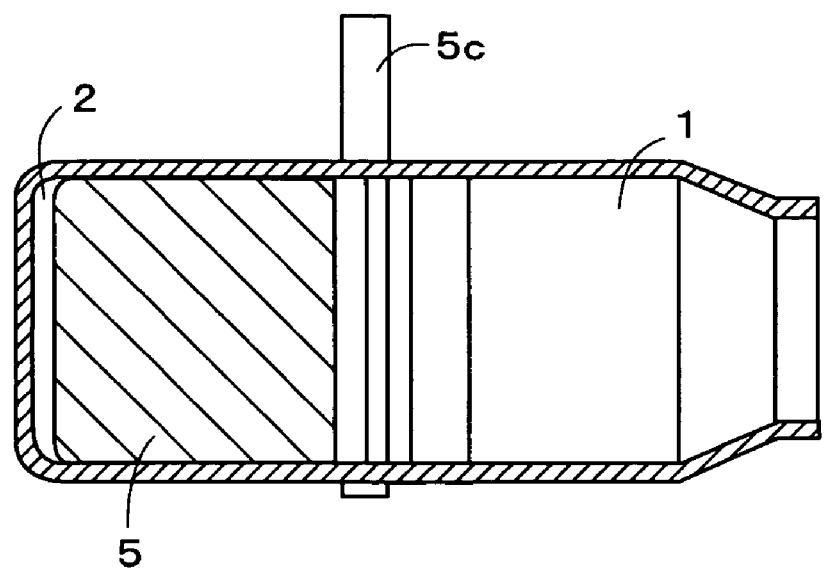
[FIG. 14] is a cross sectional view sectioned along B-B line in FIG. 12.

FIGS. 9-14 show concrete structured embodiments of the valve member 5 and its surroundings. FIGS. 9-12 show a T-shape joint JT, which constitutes the connected section (confluence section) of the main flow passage 1 and the bypass flow passage 2 as shown in FIGS. 4-7, and the valve member 5 disposed therein, respectively, and FIGS. 13 and 14 show the cross sectional view sectioned along A-A line and the cross sectional view sectioned along B-B line in FIG. 12, respectively. The joint JT is a high temperature heat resisting casting part or sheet metal part, which may be made integrally, or in a structure assembled by a plurality of members, and which it is required to obtain a heat resistance property against high temperature exhaust gas, and an operational reliability of the valve member 5 to be accommodated. According to the present embodiment, the connecting section of the main flow passage 1 and the bypass flow passage 2 has a flow passage of approximately rectangular cross section as shown in FIGS. 13 and 14, on which the valve member 5 is disposed to slide.

Accordingly, the valve body 5*b* constituting the valve member 5 is a columnar body having a cross section of a folding fan shape made from high temperature heat resisting material, with approximately rectangular outer side surfaces 51 and 52 being formed. Also, the outer peripheral wall surface 5*a* of the valve body 5*b* is formed in approximately rectangular shape as viewed from its side, and disposed to be slidable on the inner wall surface of the main flow passage 1 and the inner wall surface of the bypass flow passage 2. In conformity with them, the inner wall surface 1*b* of the opening portion of the main flow passage 1 opened into the bypass flow passage 2 is formed in a curved surface to be fitted onto the outer peripheral wall surface 5*a* of the valve body 5*b*. The valve body 5*b* may be made integrally, or in a structure assembled by a plurality of members, or made in a solid or hollow structure. The valve body 5*b* is not necessarily formed in the columnar body having the cross section of folding fan shape, but it may be made in any shapes, so far as it has the flow passage switching function and flow passage area regulating function. Furthermore, the driving system is not necessarily limited to the rotational driving, but it may employ a reciprocating spool valve or a slide type three way valve.

On the hinge portion of the valve body 5*b*, provided is the axis 5*c*, which extends out of the joint JT as shown in FIG. 14, and which is mounted to be rotated by the actuator ACT as described before. As for air-tight supporting structure for the axis 5*c*, and air-tight structure for the valve body 5*b* and joint JT, the sealing structure used for the known valve structure in the exhaust system may be employed, and the heat resistance means may be disposed between the axis 5*c* and the actuator ACT, while those drawings are omitted herein. Furthermore, in the case where the temperature conditions are severe, there may be provided means for forcedly cooling the valve body 5*b*, axis 5*c* and joint JT. As for the cooling means, for example, there are heat sink structure, means for applying cool wind or coolant from outside, and etc.

The valve member 5 in the embodiment as shown in FIGS. 1-14, is disposed on the confluent section between the main flow passage 1 and the bypass flow passage 2, i.e., on the immediate downstream side of the pre-converter 3, to be remote from the internal combustion engine EG. Depending on the designing circumstances, however, it may be disposed on a branch section between the main flow passage 1 and the bypass flow passage 2, i.e., on the upstream side of the pre-converter 3.

Figure 15:
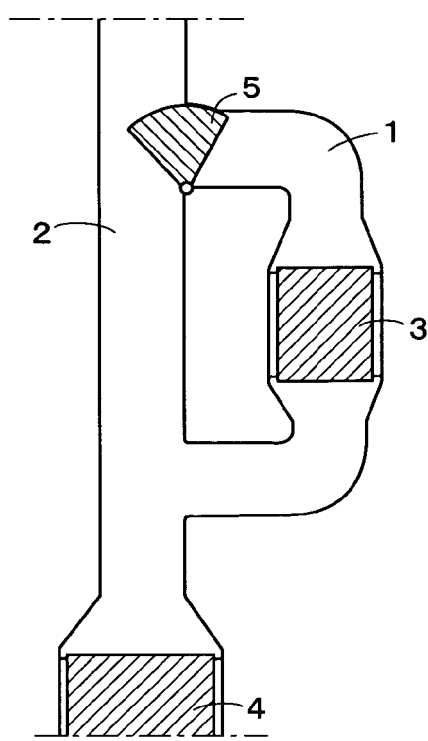
[FIG. 15] is a cross sectional view enlarging a part of an exhaust apparatus according to a further embodiment of the present invention.

Although the embodiment as disclosed in FIGS. 1-15 relates to the structure with the main flow passage 1 of the curved pipe having the pre-converter 3 disposed therein, being connected to the bypass flow passage 2 of the straight pipe, the structure may be formed to connect the main flow passage 1 of the straight pipe to the bypass flow passage 2 of the curved pipe, as shown in FIG. 16. That is, according to the embodiment as shown in FIG. 16, the pre-converter 3 is disposed in the main flow passage 1 of the straight pipe, and the valve member 5 is disclosed on the branch section between the main flow passage 1 and the bypass flow passage 2, i.e., on the upstream side of the pre-converter 3, in the same manner as shown in FIG. 15. Furthermore, in FIG. 16, a heat radiating section 8 like a heat sink is provided on the outer peripheral surface of the bypass flow passage 2, and it is so constituted to cool the exhaust gas passing through the bypass flow passage 2, thereby to reduce the temperature of the exhaust gas fed into the main converter 4 on the downstream side of the bypass flow passage 2. In addition, provided that the heat sink device or the forced cooling means (not shown) is installed, the temperature of the exhaust gas in the converter 4 can be reduced further. In order to cool the valve body 5*b* itself forcedly, a passage may be formed in the valve body 5*b* and axis 5*c*, for example, thereby to circulate the coolant (e.g., coolant in the internal combustion engine EG), and in addition to it, a passage like a water jacket (not shown) may be provided in the joint JT.

FIGS. 17-20 show another embodiment of the valve body according to the present invention, wherein the valve bodies 5*v*, 5*w*, 5*x* and 5*y* are made by the high heat resistance material, and they have various cross sectional shapes. And, any of them is formed with two outer side surfaces which correspond to the outer side surface 51 for opening or closing the main flow passage 1, and the outer side surface 52 for opening or closing the bypass flow passage 2 in the valve member 5 as described before, to act in the same manner as the valve body 5*b* having the cross section of folding fan shape. That is, according to any of the valve bodies 5*v*, 5*w*, 5*x* and 5*y*, it is so constituted that the outer side surface for substantially opening or closing the main flow passage 1 and the outer side surface for substantially opening or closing the bypass flow passage 2 are formed to be apart from each other, so that opening or closing operation of the flow passage by each outer side surface is caused to be delayed (or, advanced) in response to movement (rotation) of each valve body. As a result, according to any of the valve bodies 5*v*, 5*w*, 5*x* and 5*y*, the flow passage area of the main flow passage 1 can be varied to be regulated within a range of the rotational angle θm of the valve member 5, and the flow passage area of the bypass flow passage 2 can be varied to be regulated within a range of the rotational angle θb of the valve member 5, as shown in FIG. 1.

Figure 17:
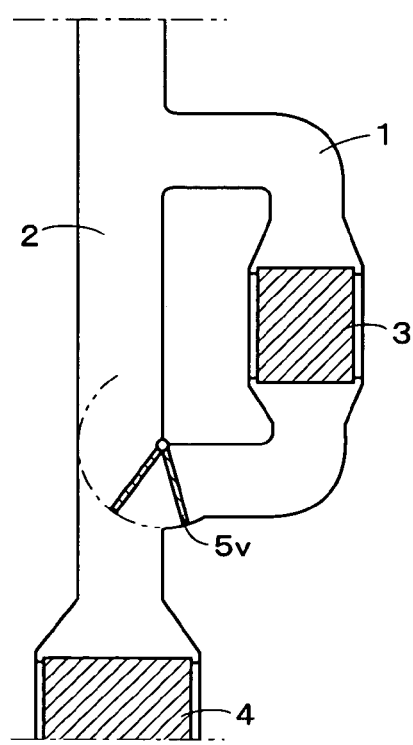
[FIG. 17] is a cross sectional view showing a structural example of a valve body for use in an exhaust apparatus of the present invention.
Figure 18:
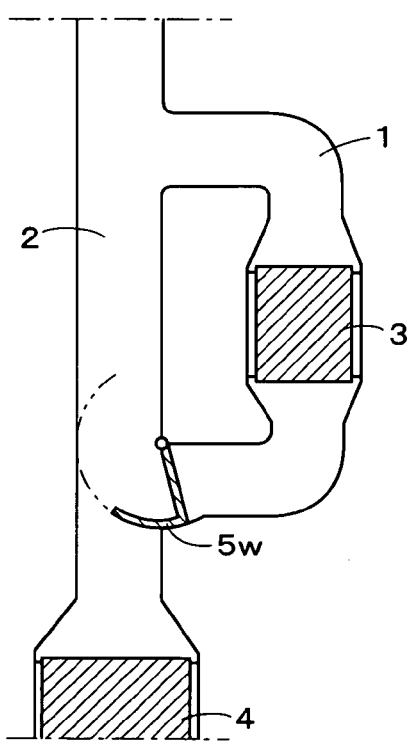
[FIG. 18] is a cross sectional view showing a structural example of a valve body for use in an exhaust apparatus of the present invention.
Figure 19:
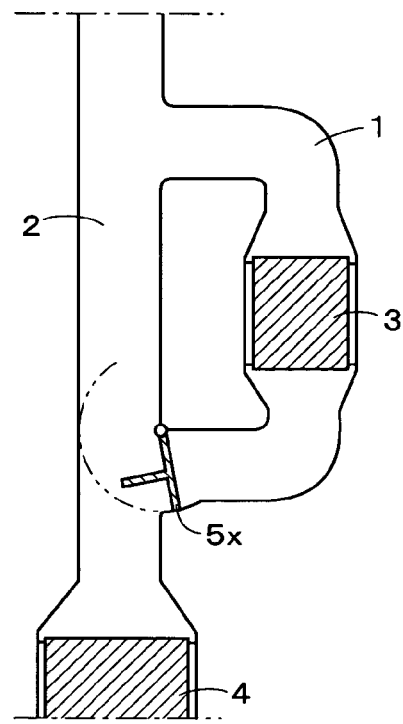
[FIG. 19] is a cross sectional view showing a structural example of a valve body for use in an exhaust apparatus of the present invention.
Figure 20:
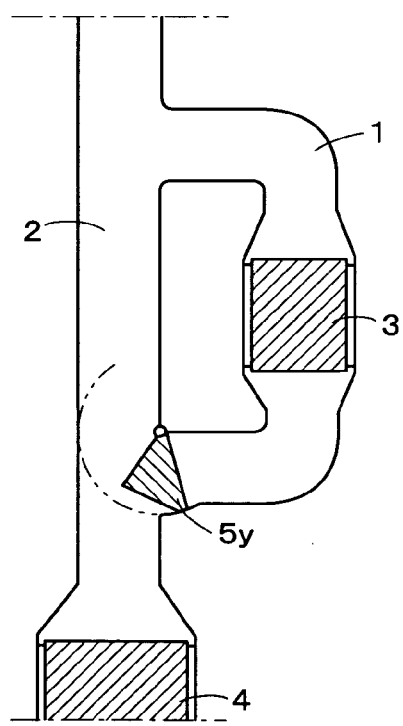
[FIG. 20] is a cross sectional view showing a structural example of a valve body for use in an exhaust apparatus of the present invention.

The valve body 5*v* as shown in FIG. 17 is formed by connecting two plate materials at an acute angle between them, to provide a V-shape cross section. The valve body 5*w* as shown in FIG. 18 is formed by connecting a plate material having a circular arc cross section, to a tip end of a plate material, to provide approximately L-shape cross section. Likewise, the valve body 5*x* in FIG. 19 is formed by connecting a plate material at a middle portion thereof with another plate material, to provide a T-shape cross section. And, the valve body 5*y* as shown in FIG. 20 is formed by a triangular column having a triangle cross section. Any of those valve bodies is formed such that the outer side surface for substantially opening or closing the main flow passage 1 and the outer side surface for substantially opening or closing the bypass flow passage 2 are formed to be apart from each other, as a result, it has the aforementioned flow passage switching function and flow passage area regulating function.

As described above, according to the single valve member 5 having the flow passage switching function and flow passage area regulating function, an appropriate integrated control, with the gas purifying requirement, output requirement and muffling requirement being taken into consideration, can be achieved. In view of a control system, those embodiments are considered as follows: That is, when the temperature of the engine coolant is equal to or lower than a predetermined temperature, i.e., when the engine is cold, the bypass flow passage 2 is placed in its closed state, whereas with respect to the main flow passage 1, a trade-off control is performed between the exhaust purifying requirement (increasing the temperature of catalytic substrate) and the output requirement. After the temperature of the engine coolant exceeded the predetermined temperature to be warmed up (unless the fuel-cut is being made), the main flow passage 1 is placed in its closed state, whereas with respect to the bypass flow passage 2, a trade-off control is performed between the output requirement and the muffling requirement.

Figure 22:
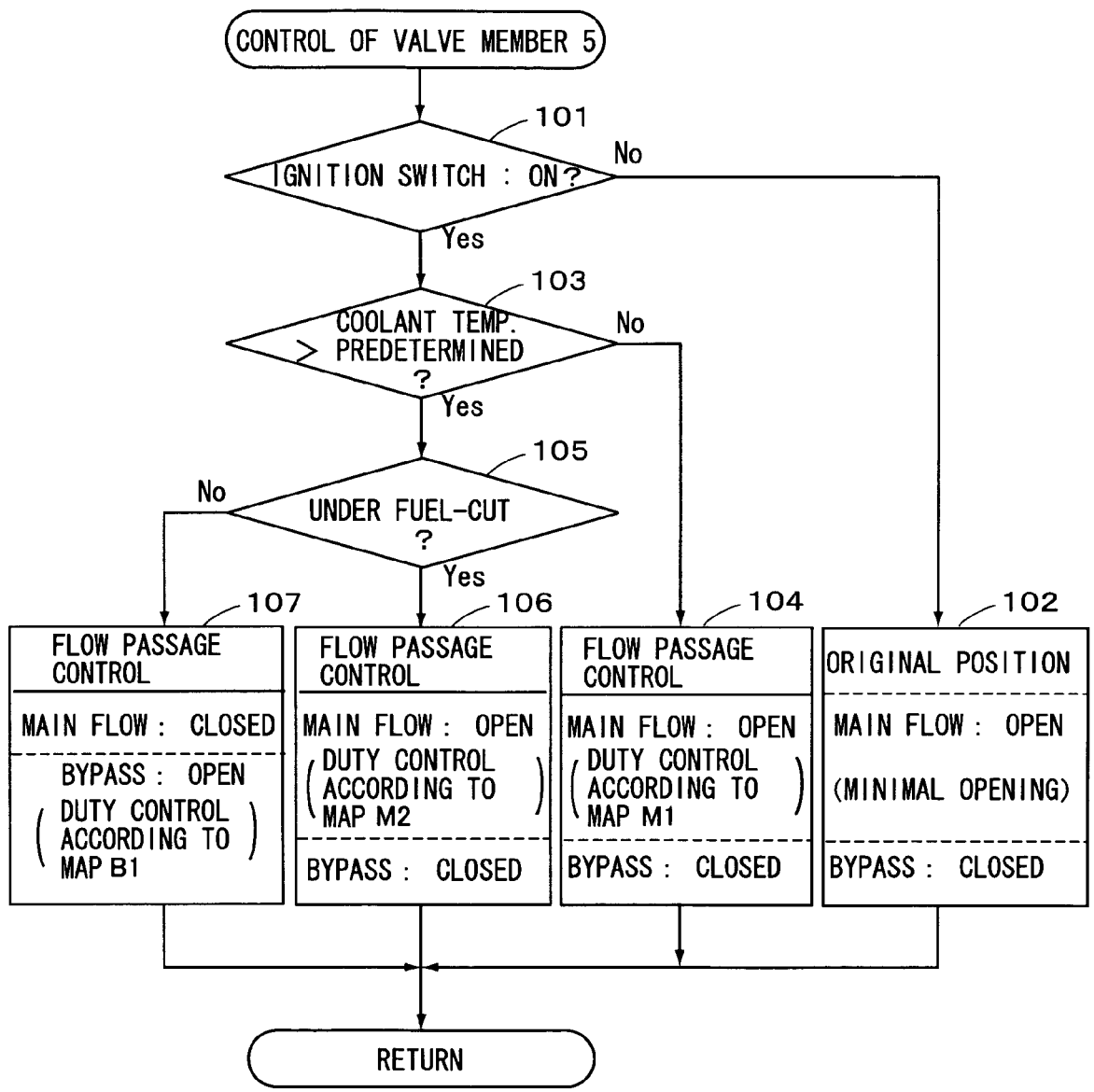
[FIG. 22] is a flowchart showing a control of a valve member according to an embodiment of the present invention.

Hereinafter, the control of the valve member 5 is explained, referring to a flow chart as shown in FIG. 22. At the outset, it is determined at Step 101 whether an ignition switch (not shown) is turned on or not. If it has not been turned on, the program proceeds to Step 102, where the valve member 5 is held to be placed in its original position. That is, the bypass flow passage 2 is placed in its closed state, and the main flow passage 1 is placed in its open state, with its minimal opening area. If it is determined at Step 101 that the ignition switch is turned on, the program further proceeds to Step 103, where the temperature of the engine coolant is compared with the predetermined temperature. When the temperature of the engine coolant is equal to or lower than the predetermined temperature, i.e., when the engine is cold, the program proceeds to the flow passage control of Step 104, where the bypass flow passage 2 is placed in its closed position, and the main flow passage 1 is controlled in duty by the actuator ACT according to a map M1. The map M1 is used for performing the duty control of the actuator ACT to provide the most appropriate opening range for the valve member 5, taking the priority of either the temperature of catalytic substrate (exhaust purifying requirement) or the engine output requirement on the basis of the vehicle state. For example, the map M1 is provided such that the flow rate in the main flow passage 1 is regulated on the basis of the engine speed and the accelerator operating level.

If it is determined at Step 103 that the temperature of the engine coolant has exceeded the predetermined temperature, the program further proceeds to Step 105, where it is determined whether the fuel-cut is being made or not. When it is determined at Step 105 that the fuel-cut is being made, the program proceeds to the flow passage control of Step 106, where the bypass flow passage 2 is placed in its closed position, and the main flow passage 1 is controlled in duty according to the map M2. The map M2 is used for performing the duty control of the actuator ACT to provide the most appropriate opening range, on the basis of an amount of pumping loss required for the engine brake. Also, the map M2 is provided such that the flow rate in the main flow passage 1 is regulated on the basis of the engine speed and the accelerator operating level.

On the other hand, if it is determined at Step 105 that the fuel-cut is not being made, the program proceeds to the flow passage control of Step 107, where the main flow passage 1 is placed in its closed position, and the bypass flow passage 2 is controlled in duty according to the map B1. The map B1 is used for performing the duty control of the actuator ACT to provide the most appropriate opening range for the valve member 5, taking the priority of either the muffling requirement or the engine output requirement on the basis of the vehicle state. For example, the map B1 is provided such that the flow rate in the main flow passage 1 is regulated on the basis of the engine speed and the accelerator operating level.

In order that the trade-off control is performed between the exhaust purifying requirement (increasing the temperature of catalytic substrate) and the output requirement, or that the trade-off control is performed between the output requirement and the muffling requirement, as described above, the prior apparatus requires a plurality of valve members, which have to be controlled cooperatively, to result in complexity of structure and control. Whereas, according to the present embodiment, the above-described trade-off controls can be performed smoothly, with the flow passage control of the main flow passage 1 and the bypass flow passage 2 being performed only by the single valve member 5. This can be done by the flow passage switching function and flow passage area regulating function, and particularly contributed by the latter, which affects on the back pressure regulation. That is, there is such a relationship that the muffling effect can be increased, with the flow passage area being decreased to add the back pressure, at one hand, and the engine output can be increased, with the flow passage area being increased to reduce the back pressure, at the other hand. As these are traded off by a parameter of the "back pressure", they can be balanced appropriately in response to the vehicle state.

In each embodiment as described above, the catalytic substrate provided for the pre-converter 3 and main converter 4, includes not only the catalytic substrate in a narrow sense, such as a three-way catalyst, HC or NOx absorbing catalyst, oxidation catalyst or the like, but also filters such as a diesel particulate filter (DPF). Its material may be ceramic or metal, and holding or shock absorbing member with any material may be provided or not. Furthermore, any embodiment may be provided with additions such as a heater, liquid atomizer, various sensors, heat insulator. Its necessary sections may be formed in a plurality of layers for hot insulation. Instead, its section to be heated up at high temperature may be formed in such a structure as a heat radiation accelerating structure, or positive cooling structure. Of course, any type of the internal combustion engine EG may be employed, and its number of cylinders or its mounting type is optional.

Figure 23:
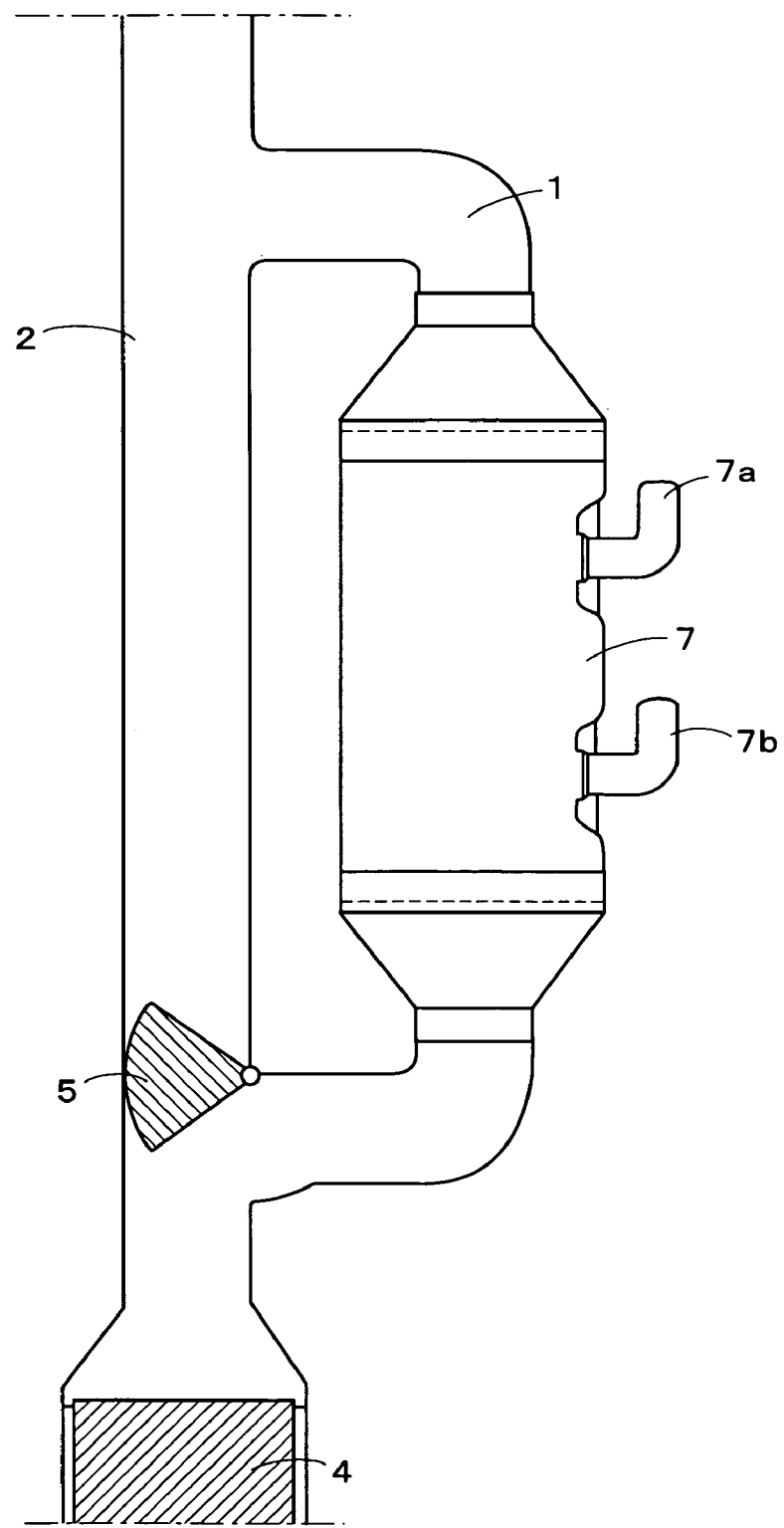
[FIG. 23] is a partially cross sectioned view enlarging a part of an exhaust apparatus provided with an exhaust heat recovery device as an exhaust processing device, according to another embodiment of the present invention.

Next, will be explained the exhaust heat recovery device according to another embodiment of the present invention, with reference to FIGS. 23-25. As for the exhaust processing device in the present embodiment, instead of the pre-converter 3, a heat exchanger 7 is disposed on the main flow passage 1, as shown in FIG. 23. According to the heat exchanger 7, the heat transfer medium is continuously introduced into it from its upstream pipe (not shown) through its flow inlet 7a, to cool the exhaust gas in the main flow passage 1. Then, the medium with heat of the exhaust gas absorbed is discharged from its flow outlet 7b, to be supplied to desired portions requiring the heat, such as a heater, various oil warmers, for example. In this case, it is so constituted that the heat of the exhaust gas is positively transferred to the heat transfer medium by means of fluid resistance (not shown) such as fins formed within the heat exchanger 7. Therefore, the exhaust energy is reduced by the fluid resistance to reduce the exhaust noise. As the reduced quantity of exhaust noise corresponding to it can be ensured, through the flow passage regulation performed by the valve member 5 when the flow is bypassed, the sub-muffler is not required to be disposed on the bypass flow passage 2.

Figure 24:
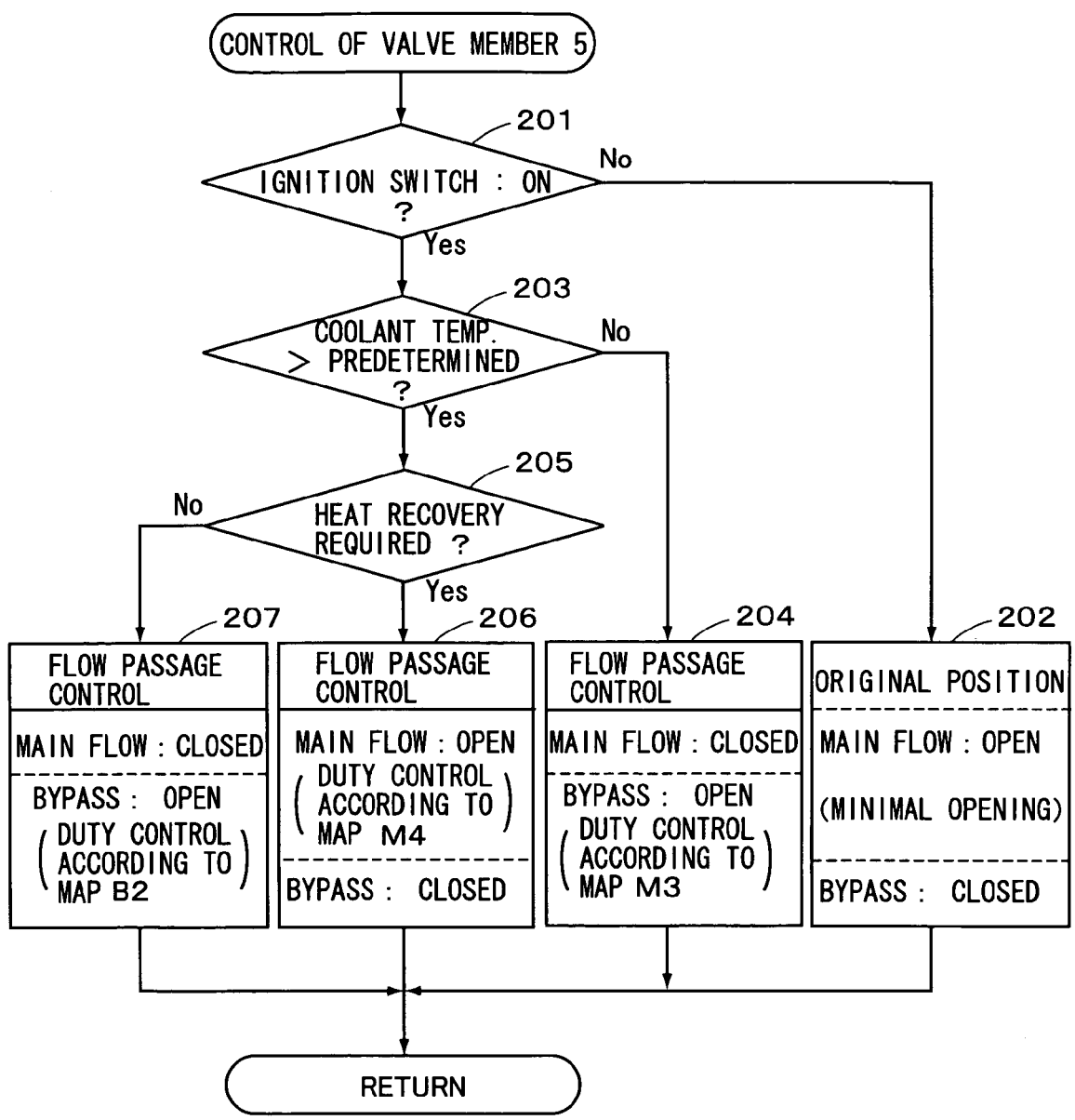
[FIG. 24] is a flowchart showing a control of a valve member according to another embodiment of the present invention.
Figure 25:
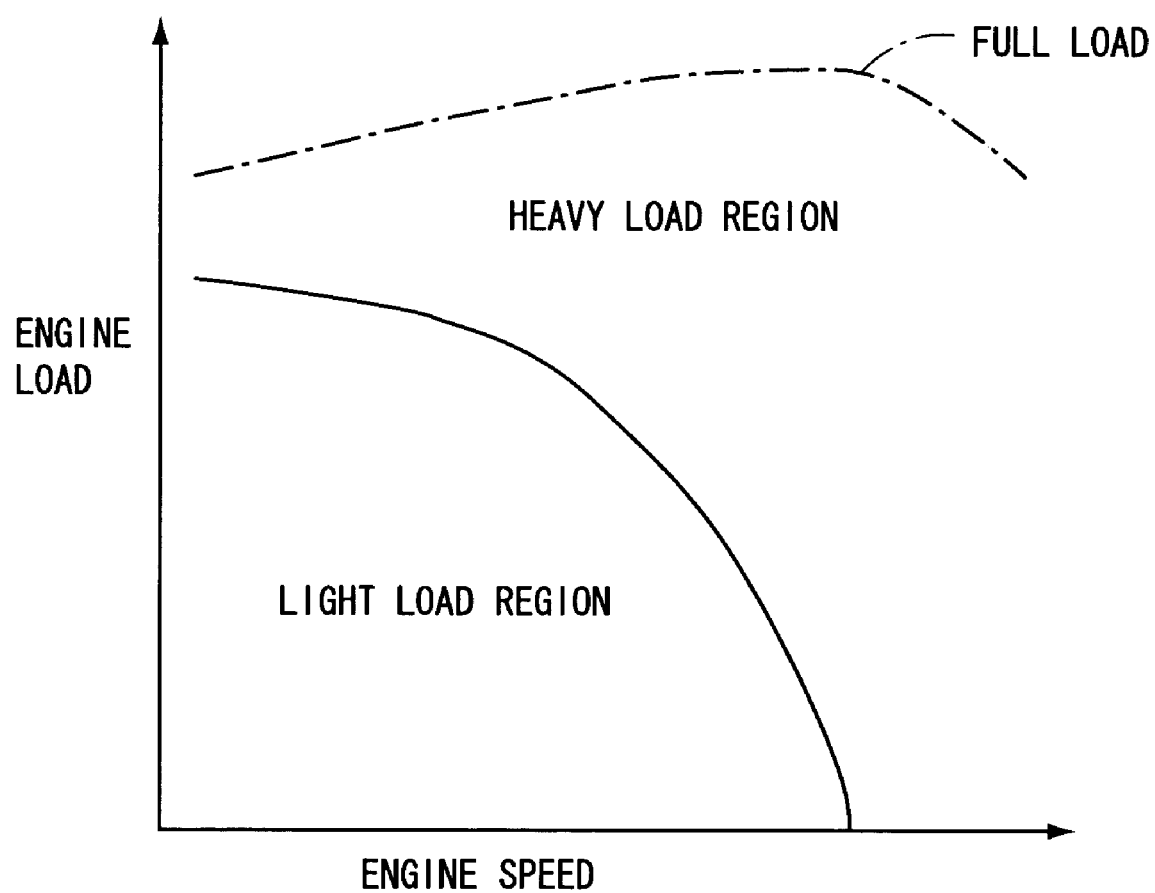
[FIG. 25] is a graph showing a structural example of a section of an engine load region for use in another embodiment of the present invention.

Referring to a flowchart as shown in FIG. 24, the control of the valve member 5 in the exhaust heat recovery device will be explained. At Step 201, it is determined whether the ignition switch (not shown) is turned on or not. If it has not been turned on, the program proceeds to Step 202, where the valve member 5 is held to be in its original position. That is, the bypass flow passage 2 is placed in its closed state, and the main flow passage 1 is placed in its open state with its minimal opening range. If it is determined at Step 201 that the ignition switch is turned on, the program further proceeds to Step 203, where the temperature of the engine coolant is compared with the predetermined temperature. When the temperature of the engine coolant is equal to or lower than the predetermined temperature, i.e., when the engine is cold, the program proceeds to the flow passage control of Step 204, where the main flow passage 1 is placed in its closed position, and the bypass flow passage 2 is controlled in duty by the actuator ACT according to the map M3. The map M3 is used for performing the duty control of the actuator ACT to provide the most appropriate opening range for the valve member 5, taking the priority of either the muffling requirement or the engine output requirement in response to the vehicle state. For example, the map M3 is provided such that the flow rate in the main flow passage 1 is regulated in response to the engine speed and the accelerator operating level.

If it is determined at Step 203 that the temperature of the engine coolant has exceeded the predetermined temperature, the program further proceeds to Step 205, where necessity of the heat recovery is determined. When it is determined at Step 205 that the heat recovery is necessary, the program proceeds to the flow passage control of Step 206, where the bypass flow passage 2 is placed in its closed position, and the main flow passage 1 is controlled in duty according to the map M4. The map M4 is used for controlling the back pressure in duty, to obtain the desired quantity of heat recovery. In order to increase its heat exchanging rate, the valve member 5 may be regulated to be intentionally throttled, to prolong the time (heat exchange time) for the exhaust gas to contact the fluid resistance such as fins or the like.

On the other hand, if it is determined at Step 205 that the heat recovery is unnecessary, the program proceeds to the flow passage control of Step 207, where the main flow passage 1 is placed in its closed position, and the bypass flow passage 2 is controlled in duty according to the map B2. The map B2 is used for performing the duty control of the actuator ACT to provide the most appropriate opening range for the valve member 5, taking the priority of either the muffling requirement or the engine output requirement in response to the vehicle state. For example, the opening range is provided according to the region as defined in FIG. 25. That is, the load region is divided by the engine speed and the engine load as shown in FIG. 25. In the heavy load region, the priority is given to the engine output performance rather than the muffling performance, and the most appropriate opening area (flow passage area) is provided. On the other hand, in the light load region, the priority is given to the muffling performance (by applying the back pressure) rather than the engine output performance, and the most appropriate opening area (flow passage area) is provided.

Any type and structure of the heat exchanger provided for the embodiment as described above may be used, and any heat transfer medium may be employed. The present invention can be applied to not only the exhaust heat recovery device as described above, but also various exhaust processing devices such as an exhaust gas reforming device, other than the exhaust heat recovery device or the catalyst device. Furthermore, the exhaust processing devices may be disposed on both of the main flow passage and the bypass flow passage, whose embodiment will be described hereinafter.

Figure 26:
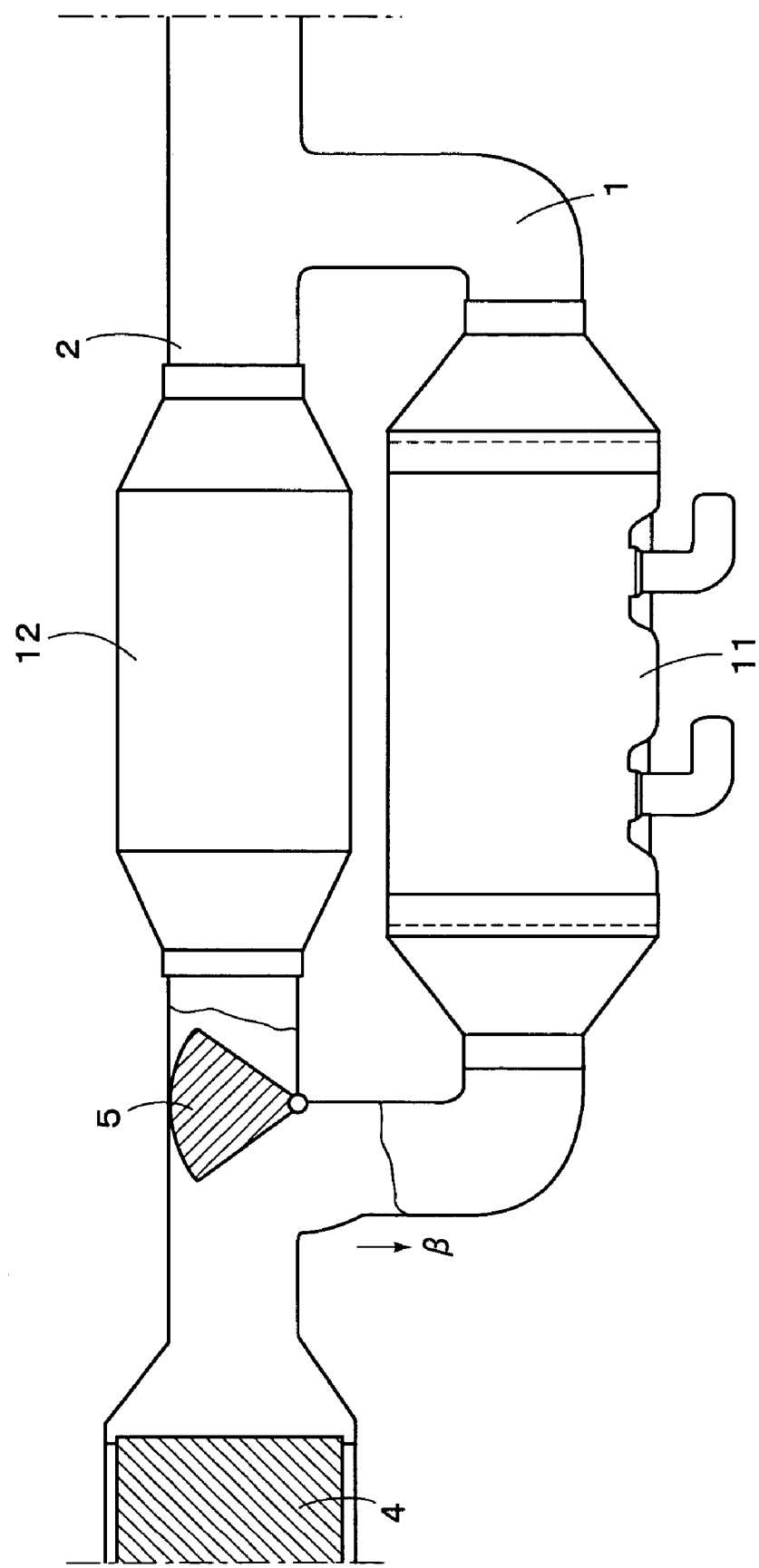
[FIG. 26] is a partially cross sectioned view enlarging a part of an exhaust apparatus with an exhaust processing device disposed in each of a main flow passage and a bypass flow passage, according to another embodiment of the present invention.

FIG. 26 shows an embodiment with the heat exchanger (called as heat recovery device or heat collector) 11 and sub-muffler 12 placed in parallel with each other, on the downstream side of the main converter 4. In recent vehicles, the heat collector (heat exchanger 11) is installed, in response to a requirement for early start of heating in the cold state. Once the heat collector is warmed up (after the coolant in the heating channel has reached a certain temperature, for example), the heat recovery will be unnecessary in most cases. Therefore, after the warm-up, it is desired to bypass the exhaust gas through a conventional exhaust channel, without passing it through the heat collector which will cause pressure loss.

According to the heat collector as described above, the pressure loss (increase of the back pressure, or decrease of the engine power) is indispensable in exchange for the heat exchange, while the muffling can be performed as its auxiliary effect. Therefore, supposing that the exhaust gas is simply bypassed, a part to be muffled by the heat collector will not be provided, thereby to increase the exhaust noise. In order to avoid this, a sub-muffler 12 similar to a conventional muffler is disposed on the bypass flow passage 2 as shown in FIG. 26, to compensate the part to be muffled by the heat exchanger 11. Further, on a rear portion of the vehicle (downstream of it), a main muffler (not shown) is disposed.

In the state as shown in FIG. 26, the bypass flow passage 2 is closed, and the main flow passage 1 is communicated with the upstream portion. In that state, the flow passage area in β-direction may be appropriately regulated in response to the driving state. The timing and quantity of regulation (throttling) may be subject to a requirement (condition) for the heat recovery quantity other than the requirements for the internal combustion engine and engine brake as described before. That is, when the heat recovery quantity is not required so much, the integrated control may be performed in accordance with the requirement having the priority at that moment, such that the throttling quantity is increased to reduce the inflow quantity of exhaust gas.

As for the heat exchanger 11 to be disposed, it is not limited to the heat collector with its main purpose provided for heat recovery into the coolant in a narrow sense, but it includes the heat exchanger (exhaust cooler, etc.) with its main purpose provided for cooling the exhaust gas. Also, as for the cooling medium, it is not limited to the water (coolant for the vehicle), but most appropriate liquid or gas may be used. And, the structure of the heat exchanger is optional.

Figure 27:
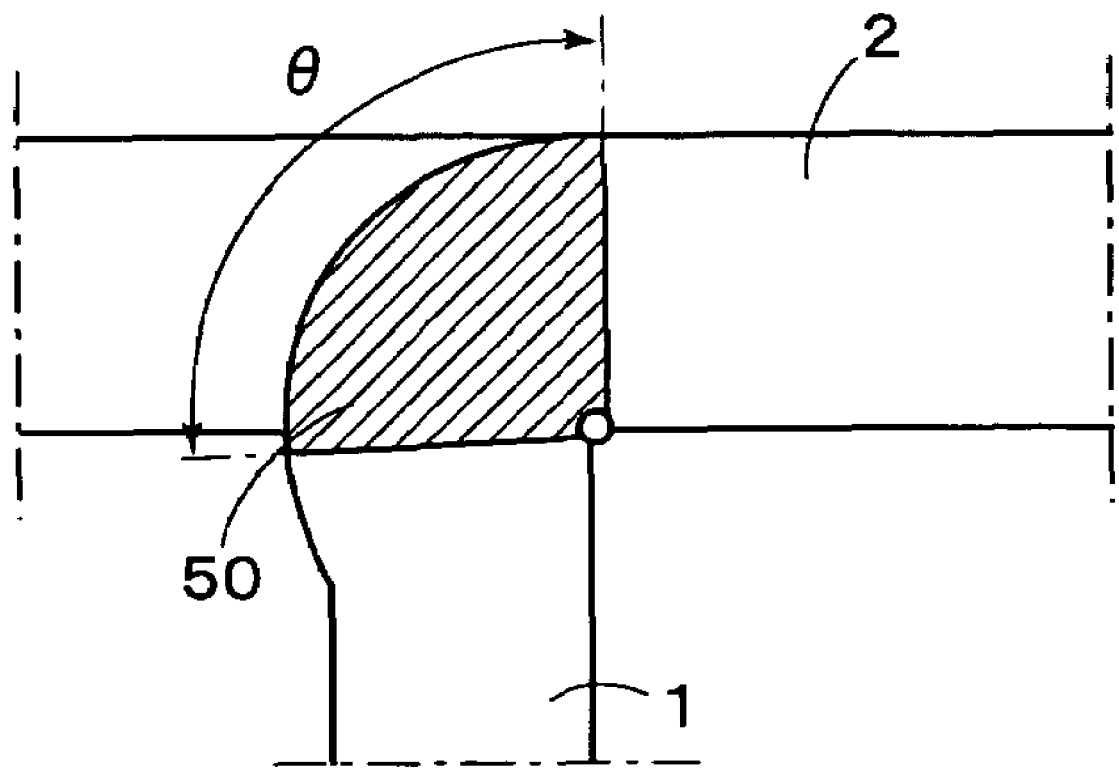
[FIG. 27] is a cross sectional view showing another structural example of a valve member in FIG. 26.

FIG. 27 shows the structure having a valve member 50 which modified the valve member 5 in the structure as shown in FIG. 26, to provide a function for closing both of the flow passages, in addition to the function for selecting one flow passage and regulating its opening range. In practice, an opening angle (operation angle) θ for the fan shape is set to be equal to or more than 90 degree. For example, in a hybrid vehicle (Japanese patent No. 3230438), this embodiment provides a mode which is appropriate to prevent the catalytic converter from being cooled, when the motoring is being made in case of the fuel-cut, or the engine is completely stopped, and which is especially appropriate to be used together with the EGR. However, it should be noted that if the opening angle (operation angle) θ for the fan shape is enlarged, the flow passage area is reduced when it is fully opened, alternatively.

Figure 28:
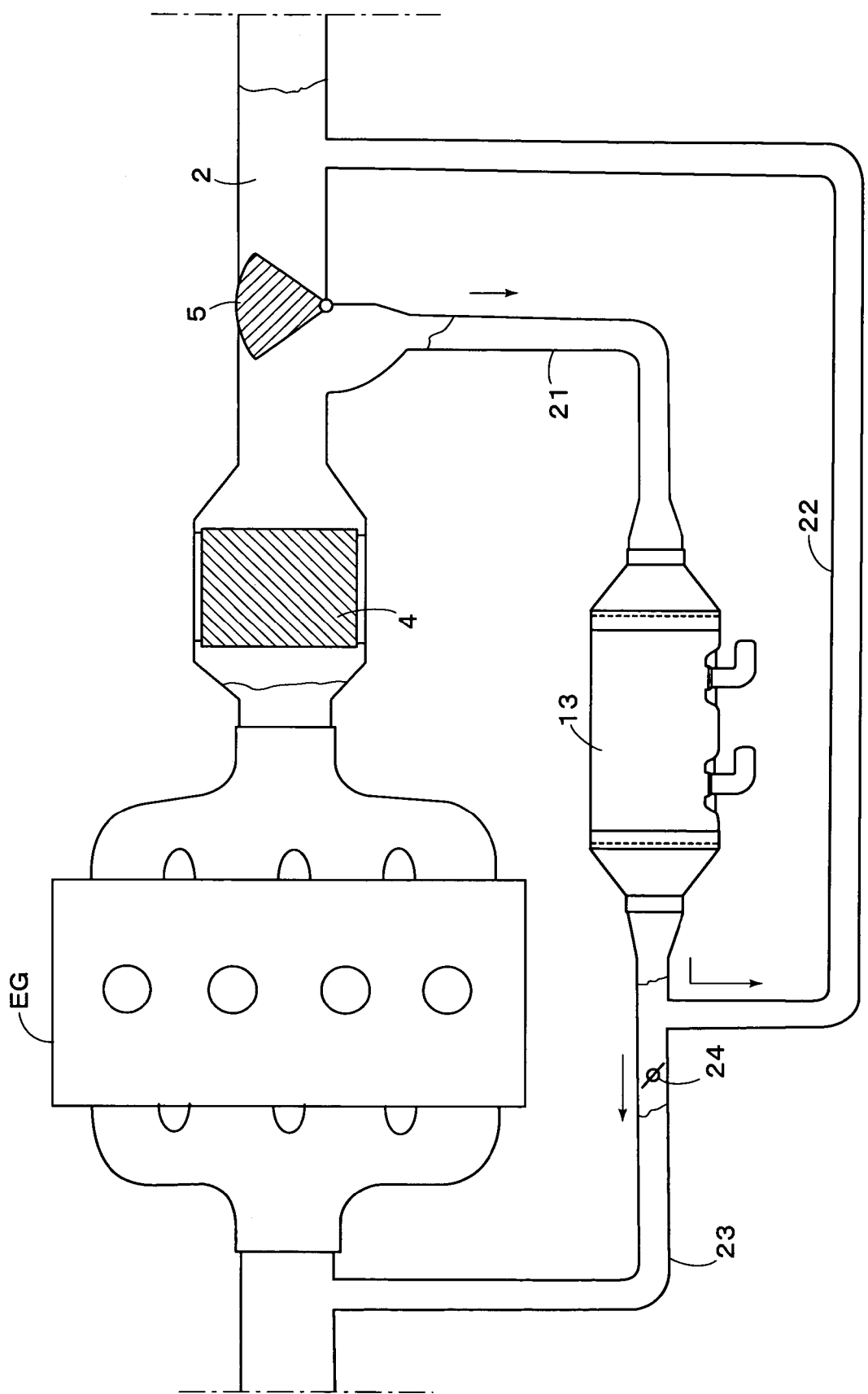
[FIG. 28] is a partially cross sectioned view enlarging a part of an exhaust apparatus installing a channel control of exhaust gas circulating through an EGR cooler, according to a further embodiment of the present invention.

FIG. 28 shows the EGR device, particularly relates to an embodiment provided with an EGR cooler 13 of a water cooling system, to use positively the heat recovered by it. As shown in FIG. 26, the heat of the exhaust gas is positively recovered. In the case where the vehicle is provided with the EGR cooler 13 (and, flow passages 21-23 for the EGR and an EGR valve 24), it has already been proposed that the EGR cooler 13 is also used as the heat collector. However, practical embodiments were very few, because it would cause the number of control valves to be increased, and cause a piping system to be complicated. Even in this embodiment, if the aforementioned valve member 5 is employed, such a system as providing also a function of the heat collector can be realized, by a simple piping system and another single valve (EGR valve 24 originally provided for the EGR system). That is, the valve member 5 is disposed in a port for introducing the EGR gas (flow passage 21), on the downstream side of the main converter 4 (or start catalytic converter).

Accordingly, when the internal combustion engine EG is cold, the flow passage area is set to be smaller than that of the valve member 5 in the state thereof as shown in FIG. 28 (with its opening range being throttled), to increase the back pressure against the internal combustion engine EG and the main converter 4, to accelerate the warm-up. When the EGR valve 24 is placed in its closed position, the circulated exhaust gas in the EGR cooler 13 is returned to the bypass passage 2 through a flow passage 22 for returning. When the vehicle travels in an ordinary condition after the warm-up, the flow rate of the circulated exhaust gas (flow passage 21) is maintained to almost correspond to the opening range of the valve member 5 in FIG. 28, and the valve member 5 is continuously controlled to be opened or closed appropriately in response to the driving state, to regulate the exhaust gas into the most appropriate flow rate. During this period, the EGR valve 24 is opened at an appropriate timing, so that a part (necessary quantity) of the exhaust gas is circulated into the intake system of the internal combustion engine EG (the flow of the exhaust gas is indicated by an arrow in FIG. 28). When the load of the internal combustion engine is heavy, the flow passage is shifted only to the bypass passage 2 having a larger diameter, to bypass the gas with low pressure loss, thereby to assist in providing a large output. In this case, no contradiction will be caused, because the EGR is not required in case of heavy load (large output is required), nor the heat recovery, usually. The system as disclosed in FIG. 28 can be applied to the gasoline internal combustion engine and diesel internal combustion engine, and of course it is appropriate to the hybrid vehicle.

Figure 29:
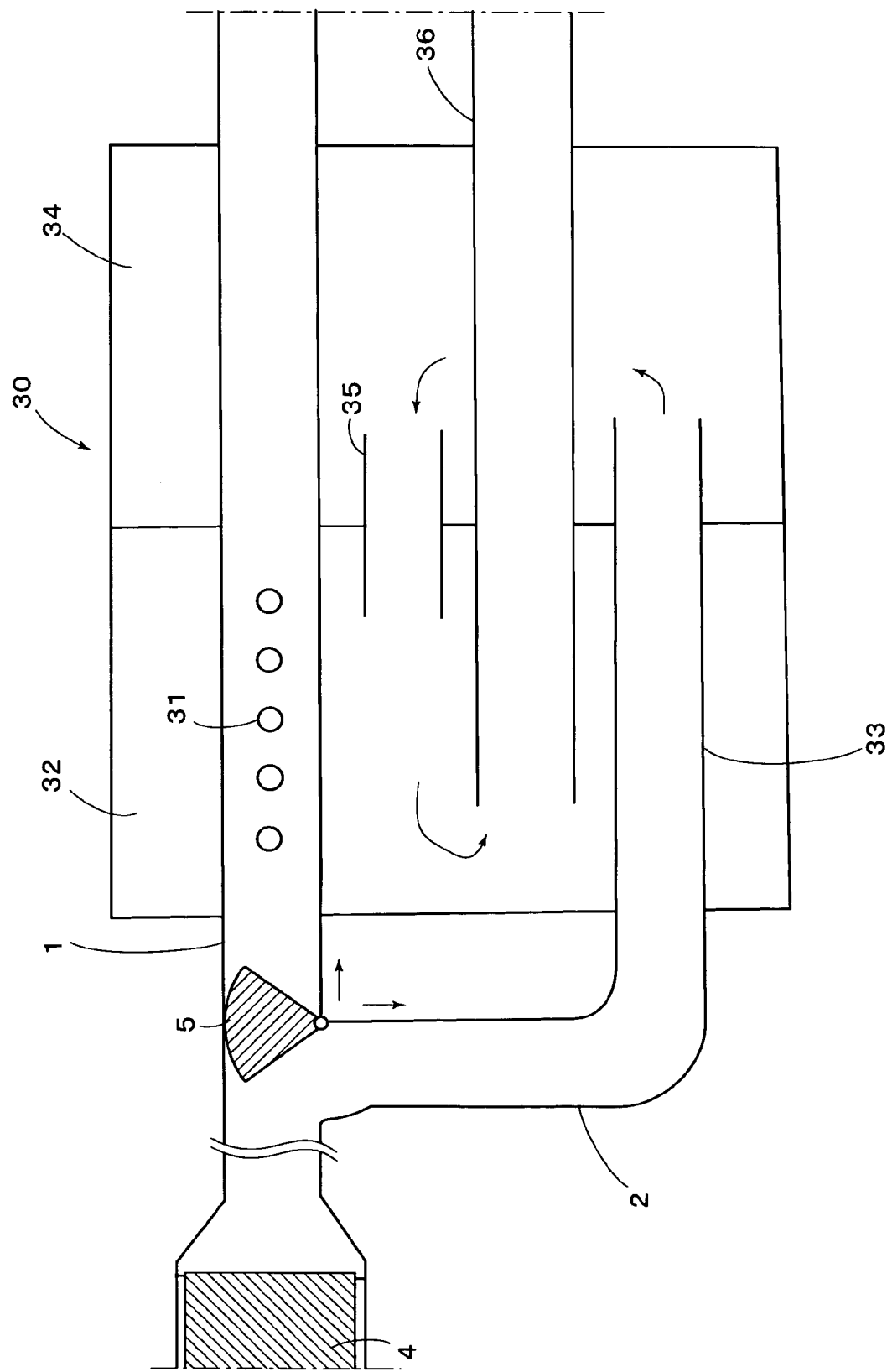
[FIG. 29] is a partially cross sectioned view enlarging a part of an exhaust apparatus, with a valve member of the present invention used for a flow regulation of exhaust gas into a muffler.

FIG. 29 shows an embodiment which is applied to the vehicle muffler, particularly to the main muffler which is mounted on the rear portion of the vehicle. According to the prior main muffler, the exhaust gas flow passages are switched by a valve (not shown), between the ordinary operation and the operation requiring the large output, so that a so-called variable muffler has been often employed. However, this valve has either a function for selecting one of the flow passages, or a function for regulating the flow rate in the single flow passage. It was impossible to switch the flow passages, and further to regulate the back pressure or noise-damping level continuously.

According to the embodiment in FIG. 29, it is so constituted that the main flow passage 1 with small pressure loss penetrates a muffler 30, to extend from the rear end of the muffler 30 (rearmost portion of the vehicle), as an outlet pipe. When the large output is required, the valve member 5 is switched to select the bypass passage 2, and the flow passage area (throttle) is regulated precisely. At this moment, the pressurized exhaust gas is communicated with a front chamber 32, through a plurality of perforated holes group 31, to result in being attenuated to provide a resonance effect, by which the noise of middle and high frequency can be reduced, with the minimal pressure loss.

On the contrary, in the ordinary state except for the state requiring the large output, the priority is given to the muffling. That is, with the valve member 5 being placed in the state as shown in FIG. 29, the exhaust gas is guided into the bypass flow passage 2, to be discharged into a rear chamber 34 through an inlet pipe 33. As a result, the muffling (attenuation of the exhaust gas energy) is achieved by the expanding function. Then, with a reducing function being caused when it is introduced into a communication pipe 35, the muffling (attenuation) is achieved, and the muffling by expansion is achieved when it is discharged, and furthermore the muffling by reduction is achieved when it is introduced into an outlet pipe 36. And, the fully muffled exhaust gas is discharged to the atmosphere from the outlet pipe 36. In this mode, the opening range of the valve member 5 is continuously controlled appropriately in response to the driving state, to regulate the exhaust gas into the most appropriate flow rate. In addition, according to the positive throttle muffling by the valve member 5, the muffling burden by the muffler 30 is reduced, so that its capacity can be reduced, to contribute its reduction in weight and cost.

Figure 30:
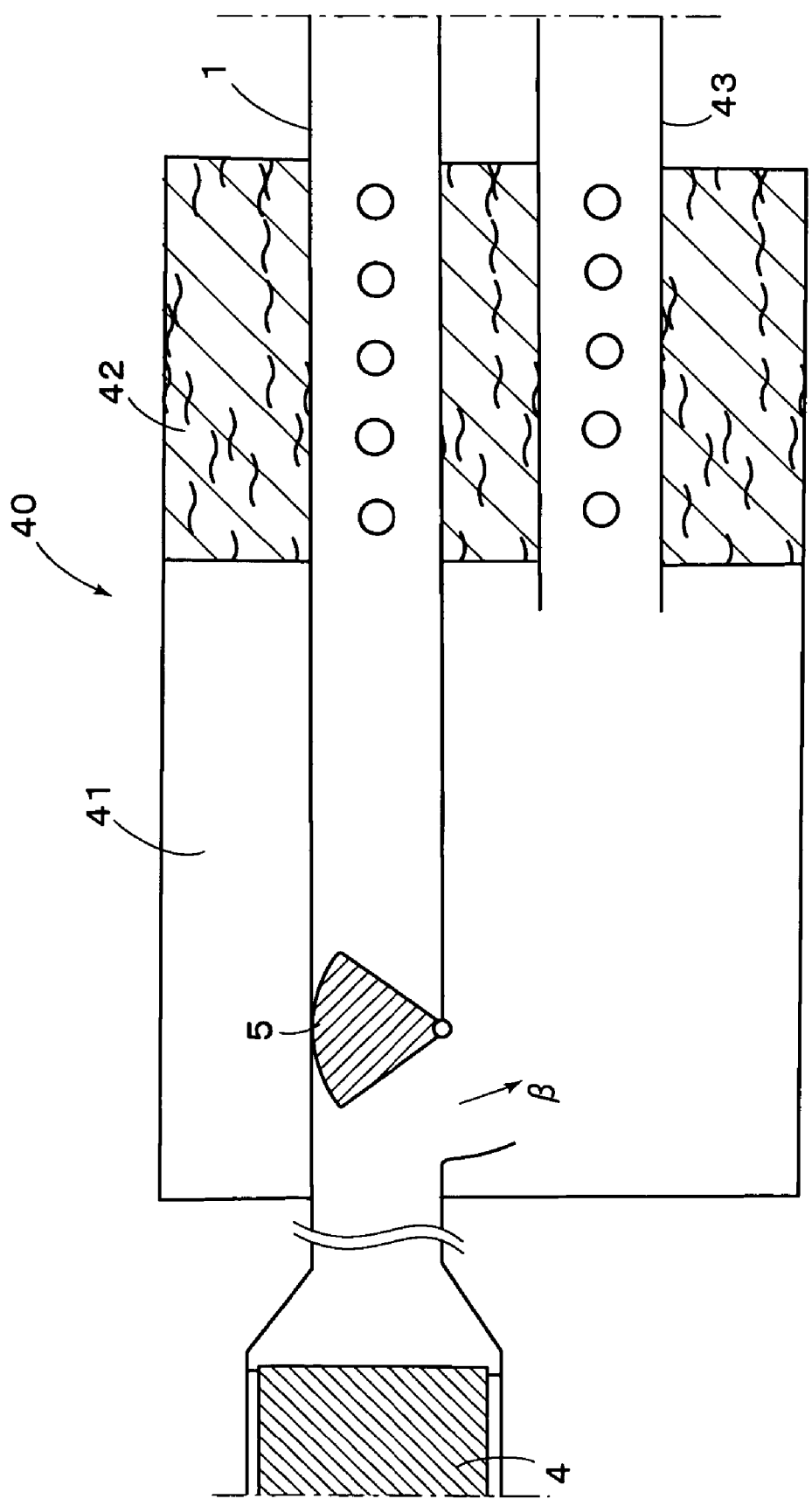
[FIG. 30] is a partially cross sectioned view enlarging a part of an exhaust apparatus, with a valve member of the present invention used for a flow regulation of exhaust gas into another muffler.

FIG. 30 shows another embodiment with the valve member 5 applied to the main muffler, wherein the main flow passage 1 penetrates a muffler 40, and functions in the same mode and in the same manner as shown in FIG. 29. And, in the ordinary state except the state requiring the large output, the priority is given to the muffling, and therefore, with the valve member 5 being placed in the state as shown in FIG. 30, the exhaust gas is guided in β direction, through an opening (into a front chamber 41) served as the bypass flow passage, to be discharged into the front chamber 41 served as the expansion chamber. When the muffling by expansion is achieved in the front chamber 41, the opening area in the β direction is varied according to the opening range of the valve member 5, so that substantial expanding ratio is varied in response to it. Therefore, the flow rate control and expansion ratio control can be made by the valve member 5 consecutively. With respect to the exhaust gas guided in the outlet pipe 43 (and 1), that of the middle and high frequency is attenuated by a resonance operation in a rear chamber 42. Furthermore, as noise absorbing material (glass wool) has been filled in the rear chamber 42, the attenuation is accelerated furthermore. Also, with the expansion ratio being varied, tone quality (timbre) will be largely varied, it may be so constituted that the timbre requirement may be added as one of the requirements with the priority given thereto (in the integrated control), so that the opening range of the valve member 5 may be regulated according to the requirement with the earliest priority given thereto in the driving state varied from hour to hour, in sequence and continuously, to have each requirement be applied with the integrated control (trade-off control).

In the integrated control (trade-off control), in order to perform the duty control by the map precisely, various sensors may be disposed in the exhaust pipe, whereby a parameter corresponding to each requirement may be detected, to be reflected on the map control. With respect to the sensors to be used in this case, a pressure sensor may be used if the parameter is the back pressure, a temperature sensor may be used if the parameter is the temperature of exhaust gas or temperature of catalyst base, and a microphone (and frequency analyzer, not shown) may be used if the parameter is the noise-damping level, or timbre. The object to be applied with the present invention is not limited to the one for use in the internal combustion engine of the vehicle or vessel. It is applicable to the exhaust system of every internal combustion engine, such as a general internal combustion engine, fixed type internal combustion engine or the like.

The invention claimed is:

1. An exhaust apparatus of an internal combustion engine having at least two flow passages for constituting an exhaust flow passage connected to the internal combustion engine, the exhaust apparatus comprising:
 a single valve member for selecting communication of only one of the two flow passages at a time, and continuously providing a flow passage area of a selected one of the two flow passages, such that while the single valve member moves from a valve-opened to a valve-closed state with respect to the selected one of the two flow passages, the single valve member remains in a valve-closed state with respect to an other one of the two flow passages until the single valve member reaches a valve-closed state with respect to the selected one of the two flow passages.

2. The exhaust apparatus of claim 1, wherein
one of the two flow passages is provided for a main flow passage, and an other one of the two flow passages is provided for a bypass flow passage, with opposite ends of the bypass flow passage being communicated with the main flow passage, and wherein
an exhaust processing device is disposed in at least one of the main flow passage and the bypass flow passage, with the single valve member being disposed on one of an upstream side and a downstream side of the exhaust processing device, the single valve member selecting communication of one of the main flow passage and the bypass flow passage, and continuously providing the flow passage area of the selected one of the main flow passage and the bypass flow passage.

3. The exhaust apparatus of claim 2, wherein the exhaust processing device is disposed in the main flow passage, with opposite ends of the bypass flow passage being communicated with the main flow passage to bypass the exhaust processing device, the single valve member being disposed on one of the upstream side and the downstream side of the exhaust processing device.

4. The exhaust apparatus of claim 3, wherein
when the single valve member begins to move from such a state that the main flow passage provides a maximal flow passage area and the bypass flow passage is closed, the single valve member continuously reduces the main flow passage in response to a continuous movement of the single valve member, and the single valve member continues to place the bypass flow passage in the valve-closed state until a flow passage area of the main flow passage is enlarged to reach a first flow passage area, and thereafter continuously enlarges a flow passage area of the bypass flow passage, and wherein
when the single valve member begins to move from such a state that the bypass flow passage provides a maximal flow passage area and the main flow passage is closed, the single valve member continuously reduces the bypass flow passage in response to a continuous movement of the single valve member, and the single valve member continues to place the main flow passage in the valve-closed state until the flow passage area of the bypass flow passage is reduced to reach a second flow passage area, and thereafter continuously enlarges the flow passage area of the main flow passage.

5. The exhaust apparatus of claim 4, wherein
the first flow passage area is set to be a minimal flow passage area as required for the exhaust processing device, and wherein
the second flow passage area is set to be substantially zero.

6. The exhaust apparatus of claim 3, wherein
the exhaust processing device is a start catalytic converter which is disposed on an immediate downstream side of the internal combustion engine, and wherein
the single valve member is disposed on a downstream side of the start catalytic converter.

7. The exhaust apparatus of claim 3, wherein
the single valve member comprises a valve body having a cross section of a folding fan shape, the valve body having a hinge portion provided for an axis of rotation to be rotatably mounted on a connected section between the main flow passage and the bypass flow passage, the valve body having a peripheral wall surface disposed to slide on inner wall surfaces of the main flow passage and the bypass flow passage.

8. An exhaust apparatus of an internal combustion engine, having at least two flow passages, including a main flow passage for constituting an exhaust flow passage connected to the internal combustion engine, with an exhaust processing device being disposed in the main flow passage, and a bypass flow passage having opposite ends being communicated with the main flow passage to detour the exhaust processing device, the exhaust apparatus comprising:
a single valve member disposed on one of an upstream side and a downstream side of the exhaust processing apparatus, and provided for selecting communication of only one of the two flow passages at a time, and continuously providing a flow passage area of the selected one of the two flow passages, such that while the single valve member moves from a valve-opened state to a valve-closed state with respect to the selected one of the two flow passages, the single valve member remains in a valve-closed state with respect to an other one of the two flow passages until the single valve member reaches a valve-closed state with respect to the selected one of the two flow passages; and
a control means for controlling the single valve member to be actuated in response to a driving state of the internal combustion engine, to switch the flow passages between the main flow passage and the bypass flow passage, and regulate each flow passage area of the main flow passage and the bypass flow passage.

9. The exhaust apparatus of claim 8, wherein
when the single valve member begins to move from such a state that the main flow passage provides a maximal flow passage area and the bypass flow passage is closed, the single valve member continuously reduces a flow passage area of the main flow passage in response to a continuous movement of the single valve member, and the single valve member continues to place the bypass flow passage in the valve-closed state until a flow passage area of the main flow passage is enlarged to reach a first flow passage area, and thereafter continuously enlarges a flow passage area of the bypass flow passage, and wherein
when the single valve member begins to move from such a state that the bypass flow passage provides a maximal flow passage area and the main flow passage is closed, the single valve member continuously reduces the flow passage area of the bypass flow passage in response to a continuous movement of the single valve member, and the single valve member continues to place the main flow passage in the valve-closed state, until the flow passage area of the bypass flow passage is reduced to reach a second flow passage area, and thereafter continuously enlarges the flow passage area of the main flow passage.

10. The exhaust apparatus of claim 8, wherein
the control means controls the single valve member to be actuated in response to the driving state of the internal combustion engine, to meet all of an output requirement for the internal combustion engine, an exhaust processing requirement for the exhaust processing device, and a requirement for muffling exhaust of the internal combustion engine.

11. The exhaust apparatus of claim 10, wherein the exhaust processing device is a catalytic converter, and wherein when the internal combustion engine is cold, the control means gives priority to requirements for purifying exhaust gas, so that the control means controls the single valve member to be actuated to meet the exhaust processing requirement, and regulates the flow passage area of the main flow passage, and wherein after the internal combustion engine is warmed up, the control means switches the two flow passages into the bypass flow passage, and controls the single valve member to be actuated to meet the output requirement and the muffling requirement, and regulates the flow passage area of the bypass flow passage.

12. The exhaust apparatus of claim 11, wherein the exhaust processing device is a start catalytic converter which is disposed on an immediate downstream side of the internal combustion engine, and wherein the single valve member is disposed on a downstream side of the start catalytic converter.

* * * * *